US008971412B2

(12) United States Patent
Ye et al.

(10) Patent No.: US 8,971,412 B2
(45) Date of Patent: Mar. 3, 2015

(54) ADVANCED INTERPOLATION TECHNIQUES FOR MOTION COMPENSATION IN VIDEO CODING

(75) Inventors: Yan Ye, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 12/420,256

(22) Filed: Apr. 8, 2009

(65) Prior Publication Data

US 2009/0257503 A1 Oct. 15, 2009

Related U.S. Application Data

(60) Provisional application No. 61/044,023, filed on Apr. 10, 2008, provisional application No. 61/044,240, filed on Apr. 11, 2008, provisional application No. 61/057,373, filed on May 30, 2008.

(51) Int. Cl.
*H04N 7/12* (2006.01)
*H04N 11/02* (2006.01)
(Continued)

(52) U.S. Cl.
CPC ... *H04N 19/00139* (2013.01); *H04N 19/00066* (2013.01); *H04N 19/00739* (2013.01);
(Continued)

(58) Field of Classification Search
CPC ............ H04N 19/00739; H04N 7/364; H04N 19/0063; H04N 7/26808; H04N 19/0089; H04N 7/0135; H04N 7/26877; H04N 7/46; H04N 19/00127; H04N 19/00721; H04N 19/00751; H04N 19/00757
USPC .......................................................... 375/240
See application file for complete search history.

(56) References Cited

U.S. PATENT DOCUMENTS

| 5,684,538 A | 11/1997 | Nakaya et al. |
| 5,703,649 A | 12/1997 | Kondo |

(Continued)

FOREIGN PATENT DOCUMENTS

| EP | 1617672 | 1/2006 |
| GB | 2379820 A | 3/2003 |

(Continued)

OTHER PUBLICATIONS

Thomas Wiegand, Gary J. Sullivan, Gisle Bjøntegaard, and Ajay Luthra, Overview of the H.264/AVC Video Coding Standard, IEEE Transactions on Circuits and Systems for Video Technology, vol. 13, No. 7, Jul. 2003.*

(Continued)

*Primary Examiner* — Sath V Perungavoor
*Assistant Examiner* — Xiaolan Xu
(74) *Attorney, Agent, or Firm* — Todd E. Marlette

(57) ABSTRACT

This disclosure describes various interpolation techniques performed by an encoder and a decoder during the motion compensation process of video coding. In one example, an encoder interpolates pixel values of reference video data based on a plurality of different pre-defined interpolation filters. In this example, the decoder receives a syntax element that identifies an interpolation filter, and interpolates pixel values of reference video data based on the interpolation filter identified by the syntax element. In another example, a method of interpolating predictive video data includes generating half-pixel values based on integer pixel values, rounding the half-pixel values to generate half-pixel interpolated values, storing the half-pixel values as non-rounded versions of the half-pixel values, and generating quarter-pixel values based on the non-rounded versions of the half-pixel values and the integer pixel values.

30 Claims, 11 Drawing Sheets

(51) Int. Cl.
| | |
|---|---|
| *H04N 19/136* | (2014.01) |
| *H04N 19/117* | (2014.01) |
| *H04N 19/51* | (2014.01) |
| *H04N 19/192* | (2014.01) |
| *H04N 19/147* | (2014.01) |
| *H04N 19/182* | (2014.01) |
| *H04N 19/82* | (2014.01) |

(52) U.S. Cl.
CPC ... *H04N19/00357* (2013.01); *H04N 19/00175* (2013.01); *H04N 19/00303* (2013.01); *H04N 19/00896* (2013.01)
USPC .............................. 375/240.17; 375/240.16

(56) References Cited

U.S. PATENT DOCUMENTS

| | | | | |
|---|---|---|---|---|
| 2003/0112864 | A1* | 6/2003 | Karczewicz et al. | .... 375/240.01 |
| 2003/0194011 | A1 | 10/2003 | Srinivasan | |
| 2003/0202607 | A1 | 10/2003 | Srinivasan | |
| 2004/0247190 | A1 | 12/2004 | Hagai et al. | |
| 2006/0133506 | A1 | 6/2006 | Dang | |
| 2006/0291563 | A1 | 12/2006 | Park et al. | |
| 2007/0120867 | A1 | 5/2007 | Shastry et al. | |
| 2007/0223581 | A1* | 9/2007 | Iguchi | ..................... 375/240.12 |
| 2008/0037656 | A1 | 2/2008 | Hannuksela | |

FOREIGN PATENT DOCUMENTS

| | | |
|---|---|---|
| JP | 2003333599 | 11/2003 |
| KR | 2005018948 A | 2/2005 |
| KR | 100681971 B1 | 2/2007 |
| KR | 2007045662 A | 5/2007 |
| RU | 2302707 C2 | 7/2007 |
| WO | 03026296 A1 | 3/2003 |
| WO | 03058945 A2 | 7/2003 |
| WO | WO2005104564 A1 | 11/2005 |
| WO | WO2006006609 A1 | 1/2006 |
| WO | 2006108654 A2 | 10/2006 |
| WO | 2007009875 A2 | 1/2007 |

OTHER PUBLICATIONS

Sridhar Srinivasan, Shankar L. Regunathan, An Overview of VC-1, Visual Communications and Image Processing 2005, Proc. of SPIE vol. 5960 596025.*

Wiegand T et al: "Overview of the H.264/AVC video coding standard" IEEE Transactions on Circuits and Systems for Video Technology IEEE Service Center, Piscataway, NJ, US, vol. 13, No. 7, Jul. 1, 2003, pp. 560-576, XP011099249.

Srinivasan S et al: "An overview of VC-1" Visual Communications and Image Processing; Jul. 12, 2005-Jul. 15, 2005: Beijing, XP030080912.

Ye Y et al: "High precision interpolation and prediction" 35. VCEG Meeting; 85. MPEG Meeting; Jul. 16, 2008-Jul. 18, 2008; Berlin; (Video Coding Experts Group of ITU-T SG.16), Jul. 12, 2008, XP030003598.

International Search Report—PCT/US09/040260, International Search Authority—European Patent Office—Jul. 14, 2009.

Written Opinion—PCT/US09/040260, International Search Authority—European Patent Office—Jul. 14, 2009.

Y. Vatis and J. Ostermann, "Comparison of Complexity Between Two-Dimensional Non-Separable Adaptive Interpolation Filter and Standard Wiener Filter," ITU-T SGI 6/Q.6 Doc. VCEG-AA11, Nice, France, Oct. 2005.

S. Wittmann, T. Wedi, "Separable Adaptive Interpolation Filter," ITU-T SG 16/Q.6 Doc. T05-SG16-C-0219, Geneva, Switzerland, Jun. 2007.

D. Rusanovskyy, K. Ugur, J. Lainema, "Adaptive Interpolation with Directional Filters," ITU-T SG1 6/Q.6 Doc. VCEG-AG21, Shenzhen, China.

J. Jung and G. Laroche, "Performance Evaluation of the KTA 1.2 Software," ITU-T SG16/Q.6 VCEG, VCEG-AE09, Marrakech, Morocco, Jan. 2007.

Oktem, S., et al., "An Efficient Hardware Architecture for Quarter-Pixel Accurate H.264 Motion Estimation", 10th Euromicro Conference on Digital System Design Architectures, Methods and Tools (DSD 2007), Lubeck, Germany, Aug. 29-Aug. 31, 2007, abstract.

Richardson I., "H.264 video coding and MPEG-4—a new generation of standards", Moscow, Technosphere, 2005, pp. 228-231.

Vatis Y et al.: "Coding of coefficients of two-dimensional non-separable adaptive Wiener interpolation filter" Proceeding of the SPIE—The International Society for Optical Engineering, SPIE, PO Box 10 Bellingham WA 98227-0010 USA, vol. 5960, Jul. 12, 2005, pp. 623-631, XP002419200.

Wedi et al., "Direct Interpolation Filters in TML-6,ITU—Telecommunications Standardization Sector Study Group 16 Question 6 Video Coding Experts Group (VCEG)",Thirteenth Meeting: Austin, Texas, USA,Apr. 2001,VCEG-M44, pp. 1-5.

Taiwan Search Report—TW098112128—TIPO—Feb. 5, 2014.

* cited by examiner

| A1 | | A2 | | A3 | aa | A4 | | A5 | | A6 |

| B1 | | B2 | | B3 | bb | B4 | | B5 | | B6 |

| C1 | | C2 | | C3 | a | b | c | C4 | | C5 | | C6 |
| | | | | | d | e | f | g | | | | |
| cc | | dd | | h | i | j | k | ee | | ff | | gg |
| | | | | | l | m | n | o | | | | |
| D1 | | D2 | | D3 | | hh | | D4 | | D5 | | D6 |

| E1 | | E2 | | E3 | ii | E4 | | E5 | | E6 |

| F1 | | F2 | | F3 | jj | F4 | | F5 | | F6 |

ADVANCED INTERPOLATION TECHNIQUES FOR MOTION COMPENSATION IN VIDEO CODING

This application claims the benefit of U.S. Provisional Application 61/044,023 filed on Apr. 10, 2008, U.S. Provisional Application 61/044,240 filed on Apr. 11, 2008, and U.S. Provisional Application No. 61/057,373 filed on May 30, 2008 the entire contents of which are incorporated herein by reference.

TECHNICAL FIELD

This disclosure relates to digital video coding and, more particularly, fractional interpolations of predictive data used in video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or ITU-T H.264/MPEG-4, Part 10, Advanced Video Coding (AVC), to transmit and receive digital video information more efficiently. Video compression techniques may perform spatial prediction and/or temporal prediction to reduce or remove redundancy inherent in video sequences.

Block based inter-coding is a very useful coding technique that relies on temporal prediction to reduce or remove temporal redundancy between video blocks of successive coded units of a video sequence. The coded units may comprise video frames, slices of video frames, groups of pictures, or another defined unit of video blocks. For inter-coding, the video encoder performs motion estimation and motion compensation to track the movement of corresponding video blocks of two or more adjacent coded units. Motion estimation generates motion vectors, which indicate the displacement of video blocks relative to corresponding prediction video blocks in one or more reference frames or other coded units. Motion compensation uses the motion vectors to generate prediction video blocks from the reference frame or other coded unit. After motion compensation, residual video blocks are formed by subtracting prediction video blocks from the original video blocks being coded.

The video encoder may also apply transform, quantization and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values are converted into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients. Examples of entropy coding include but are not limited to content adaptive variable length coding (CAVLC) and context adaptive binary arithmetic coding (CABAC).

A coded video block may be represented by prediction information that can be used to create or identify a predictive block, and a residual block of data indicative of differences between the block being coded and the predictive block. The prediction information may comprise the one or more motion vectors that are used to identify the predictive block of data. Given the motion vectors, the decoder is able to reconstruct the predictive blocks that were used to code the residual. Thus, given a set of residual blocks and a set of motion vectors (and possibly some additional syntax), the decoder may be able to reconstruct a video frame that was originally encoded. Inter-coding based on motion estimation and motion compensation can achieve very good compression because successive video frames or other types of coded units are often very similar. An encoded video sequence may comprise blocks of residual data, motion vectors, and possibly other types of syntax.

Interpolation techniques have been developed in order to improve the level of compression that can be achieved in inter-coding. In this case, the predictive data generated during motion compensation, which is used to code a video block, may be interpolated from the pixels of video blocks of the video frame or other coded unit used in motion estimation. Interpolation is often performed to generate predictive half-pixel values (half-pel) and predictive quarter-pixel values (quarter-pel). Such interpolation often generates predictive blocks that are even more similar to the video blocks being coded than the actual video blocks of the predictive frame or other coded unit used in the video coding.

SUMMARY

In general, this disclosure describes interpolation techniques performed by an encoder and a decoder during the motion compensation process of video coding. According to the techniques of this disclosure, the encoder may apply a plurality of pre-defined interpolation filters in order to generate a plurality of different interpolated prediction data. The interpolated prediction data that achieves the highest levels of compression may be selected, and the interpolation filter that was used may be coded as syntax and communicated to the decoding device as part of the coded video data. The interpolation filter may be defined once per predictive unit (e.g., once per prediction frame), or may be defined on a block basis (e.g., different filtering may be applied to different video blocks within a predictive unit). Alternatively, the interpolation filter may be defined on a sample basis, or may be defined on a sub-sample basis.

The decoder receives the coded video data, and can interpret the syntax in order to identify the interpolation filter that was used by the encoder. In this way, the decoder can identify and use the same interpolation filters during its motion compensation processes that were used during the encoding process. By considering multiple different interpolation filters at the encoder, compression may be improved relative to techniques that have a fixed interpolation filter. At the same time, the techniques may be significantly less complex than conventional adaptive interpolation filtering, which adaptively defines the interpolation filter coefficients as part of the coding process. The different interpolation filters, according to some aspects of this disclosure, may be pre-defined by implementing adaptive interpolation filtering or other techniques on test video sequences in order to pre-define sets of interpolation filter coefficients that will likely result in good compression. Alternatively, different numbers of filter coefficients (different number of taps) or different types of filters altogether may be pre-defined, and then selected and used during the encoding and decoding processes.

In addition, this disclosure also recognizes coding inefficiencies due to conventional rounding of half-pixel values, and provides techniques that may improve interpolation by reducing or eliminating intermediate rounding. In this case, interpolated half-pixel values may be rounded for purposes of half-pixel interpolation. Quarter-pixel values, however, which may be generated based on one or more of the interpolated half-pixel values, may rely on non-rounded versions of the half-pixel values. This can eliminate propagation of rounding inaccuracies from the half-pixel values to the quarter-pixel values. In some cases, slight rounding without sacrificing the accuracy of the final values may be applied to one specific half-pixel value in order to ensure that sixteen-bit storage elements can be used to store any intermediate values of half-pixels. In particular, when fifteen possible sub-pixel locations are defined for every pixel location, one of the specific half-pixel values may need to be generated based on other half-pixel values (i.e., requiring two levels of half-pixel interpolation), and this specific half-pixel value may require rounding to ensure that sixteen-bit storage elements can be used to store all interpolated values.

In any case, the elimination of intermediate rounding tasks may be done with or without the implementation of a plurality of pre-defined interpolation filters, as described herein. For example, the elimination of intermediate rounding may be performed in the context of an implementation that uses a plurality of pre-defined interpolation filters, as described herein. Alternatively, the elimination of intermediate rounding may be performed in the context of more conventional interpolations, such as in the context of adaptive interpolation filtering (AIF).

In one example, this disclosure provides a method of encoding video data. The method comprises generating prediction data, wherein generating the prediction data includes interpolating pixel values of reference video data based on a plurality of different pre-defined interpolation filters. The method also comprises encoding the video data based on the prediction data.

In another example, this disclosure provides a method of decoding video data. The decoding method comprises receiving a syntax element that identifies an interpolation filter from a plurality of different pre-defined interpolation filters, generating prediction data, wherein generating the prediction data includes interpolating pixel values of reference video data based on the interpolation filter identified by the syntax element, and decoding the video data based on the prediction data.

In another example, this disclosure provides a method of interpolating predictive video data for video coding. The method comprises generating half-pixel values based on integer pixel values, rounding the half-pixel values to generate half-pixel interpolated values, storing the half-pixel values as non-rounded versions of the half-pixel values, and generating quarter-pixel values based on the non-rounded versions of the half-pixel values and the integer pixel values.

In another example, this disclosure provides an apparatus that encodes video data, the apparatus comprising a video encoder that includes a motion compensation unit that generates prediction data. The motion compensation unit interpolates pixel values of reference video data based on a plurality of different pre-defined interpolation filters, and the video encoder encodes the video data based on the prediction data.

In another example, this disclosure provides an apparatus that decodes video data, the apparatus comprising a video decoder that includes a motion compensation unit. The video decoder receives a syntax element that identifies an interpolation filter from a plurality of different pre-defined interpolation filters. The motion compensation unit generates prediction data, wherein generating the prediction data includes interpolating pixel values of reference video data based on the interpolation filter identified by the syntax element. The video decoder then decodes the video data based on the prediction data.

In another example, this disclosure provides an apparatus that interpolates predictive video data for video coding, wherein the apparatus includes a motion compensation unit that generates half-pixel values based on integer pixel values, rounds the half-pixel values to generate half-pixel interpolated values, stores the half-pixel values as non-rounded versions of the half-pixel values, and generates quarter-pixel values based on the non-rounded versions of the half-pixel values and the integer pixel values.

In another example, this disclosure provides a device that encodes video data, the device comprising means for generating prediction data, wherein means for generating the prediction data includes means for interpolating pixel values of reference video data based on a plurality of different pre-defined interpolation filters, and means for encoding the video data based on the prediction data.

In another example, this disclosure provides a device that decodes video data, the device comprising means for receiving a syntax element that identifies an interpolation filter from a plurality of different pre-defined interpolation filters, means for generating prediction data, wherein means for generating the prediction data includes means for interpolating pixel values of reference video data based on the interpolation filter identified by the syntax element, and means for decoding the video data based on the prediction data.

In another example, this disclosure provides a device that interpolates predictive video data for video coding, the device comprising means for generating half-pixel values based on integer pixel values, means for rounding the half-pixel values to generate half-pixel interpolated values, means for storing the half-pixel values as non-rounded versions of the half-pixel values, and means for generating quarter-pixel values based on the non-rounded versions of the half-pixel values and the integer pixel values.

In another example, this disclosure provides a device that encodes video data, the device comprising a video encoder including a motion compensation unit that generates prediction data by interpolating pixel values of reference video data based on a plurality of different pre-defined interpolation filters, and encodes the video data based on the prediction data, and a wireless transmitter that transmits the video data to another device.

In another example, this disclosure provides a device that decodes video data, the device comprising a wireless receiver that receives the video data, and a video decoder including a motion compensation unit that receives a syntax element that identifies an interpolation filter from a plurality of different pre-defined interpolation filters, generates prediction data, wherein generating the prediction data includes interpolating pixel values of reference video data based on the interpolation filter identified by the syntax element, and decodes the video data based on the prediction data.

In another example, this disclosure provides a device that encodes video data, the device comprising a video encoder including a motion compensation unit that generates half-pixel values based on integer pixel values, rounds the half-pixel values to generate half-pixel interpolated values, stores the half-pixel values as non-rounded versions of the half-pixel values, and generates quarter-pixel values based on the non-rounded versions of the half-pixel values and the integer pixel values, and a wireless transmitter that transmits the video data encoded by the motion compensation unit to another device.

In another example, this disclosure provides a device that decodes video data, the device comprising a wireless receiver that receives the video data, and a video decoder including a motion compensation unit that decodes the video data. In decoding the video data, the motion compensation unit generates half-pixel values based on integer pixel values, rounds the half-pixel values to generate half-pixel interpolated values, stores the half-pixel values as non-rounded versions of the half-pixel values, and generates quarter-pixel values based on the non-rounded versions of the half-pixel values and the integer pixel values.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution cause a device to encode video data, wherein the instructions cause the device to generate prediction data, wherein generating the prediction data includes interpolating pixel values of reference video data based on a plurality of different pre-defined interpolation filters, and encode the video data based on the prediction data.

This disclosure also contemplates a computer-readable storage medium comprising instructions that upon execution cause a device to decode video data, wherein the instructions cause the device to, upon receiving a syntax element that identifies an interpolation filter from a plurality of different pre-defined interpolation filters, generate prediction data, wherein generating the prediction data includes interpolating pixel values of reference video data based on the interpolation filter identified by the syntax element, and decode the video data based on the prediction data.

In addition, this disclosure also contemplates a computer-readable storage medium comprising instructions that upon execution cause a device to interpolate predictive video data for video coding, wherein the instructions cause the device to generate half-pixel values based on integer pixel values, round the half-pixel values to generate half-pixel interpolated values, store the half-pixel values as non-rounded versions of the half-pixel values, and generate quarter-pixel values based on the non-rounded versions of the half-pixel values and the integer pixel values.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 4A-4D are conceptual diagrams illustrating integer pixels and interpolated pixels that may comprise pixels of predictive video blocks.

DETAILED DESCRIPTION

Figure 1:
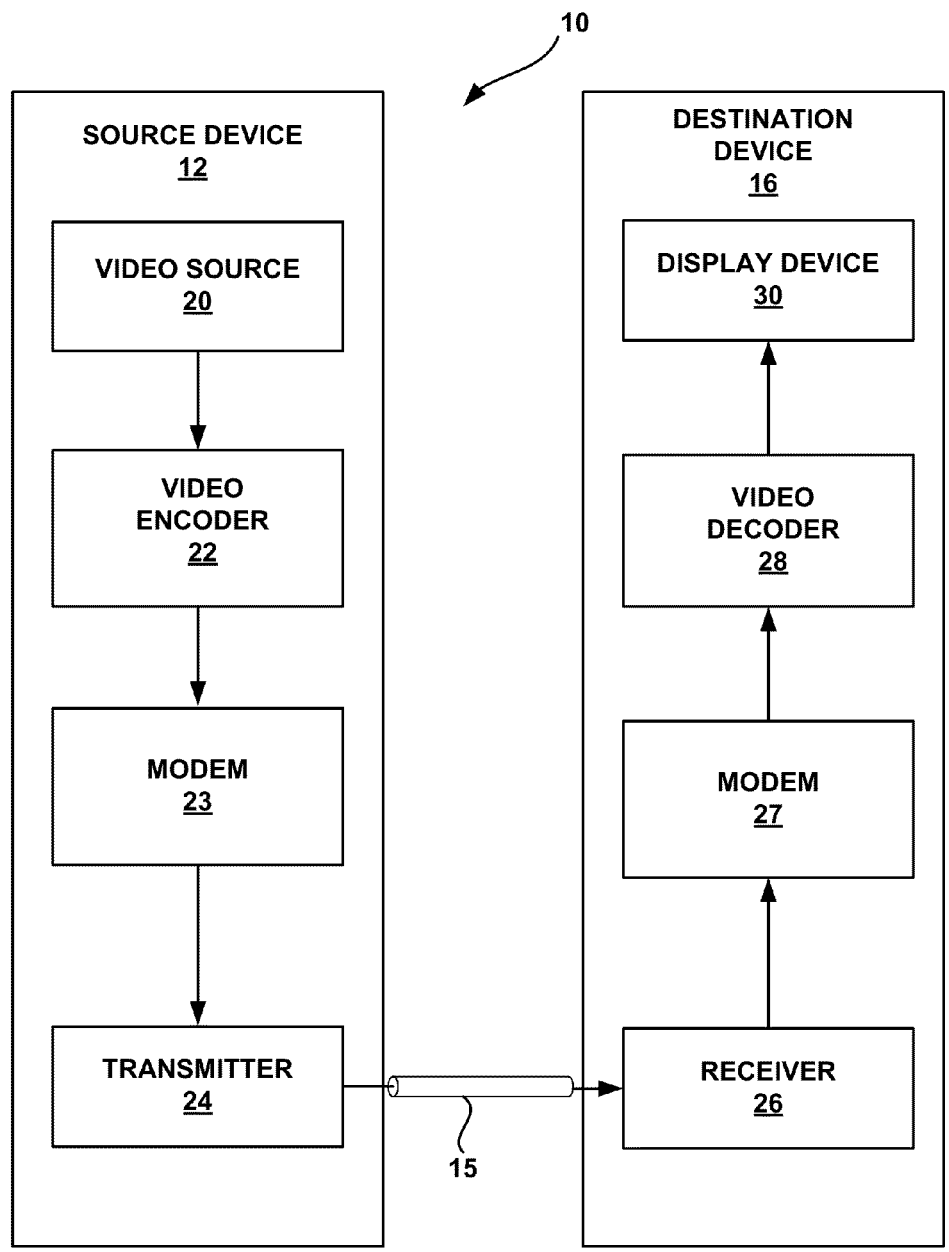
FIG. 1 is an exemplary block diagram illustrating a video encoding and decoding system.

This disclosure describes various interpolation techniques performed by an encoder and a decoder during the motion compensation process of video coding. According to one aspect of this disclosure, the encoder may apply a plurality of pre-defined interpolation filters in order to generate a plurality of different interpolated prediction data. The interpolated prediction data that achieves the highest levels of compression may be selected at the encoder, and the interpolation filter that was used may be coded as syntax and communicated to the decoding device as part of the coded video data. The interpolated prediction data comprises reference data. Video data to be coded (e.g., a video block) may be subtracted from interpolated prediction data (e.g., an interpolated predictive reference block) in order to define a residual block of encoded data, which may then be transformed, quantized and entropy coded.

The interpolation filter may be defined once per predictive unit (e.g., once per prediction frame), or may be defined on a sample basis (e.g., different filtering may be applied to different video blocks or different sample locations within a predictive unit). Different interpolation filters, for example, may be defined by different sets of filter coefficients, different numbers of filter coefficients, or possibly different filter types. In any case, by providing a plurality of pre-defined interpolation filters, the interpolated data may provide for improved data compression.

The decoder receives the coded video data, and can interpret the syntax in order to identify the interpolation filter that was used by the encoder. In this way, the decoder can identify and use the same interpolation filter during its motion compensation process that was used during the encoding process. Again, by considering multiple different interpolation filters at the encoder, compression may be improved relative to techniques that have a single defined interpolation filter. At the same time, the techniques may be significantly less complex than conventional adaptive interpolation filtering, which adaptively defines the interpolation filter (by selecting filter coefficients) as part of the coding process. In one example, the interpolation filters may be pre-defined by implementing adaptive interpolation filtering or other techniques on test video sequences in order to pre-define sets of interpolation filter coefficients that will likely result in good compression.

In another aspect of this disclosure, interpolation techniques are described that eliminate or significantly reduce intermediate rounding of half-pixel values for quarter-pixel interpolation. The techniques that eliminate or significantly reduce intermediate rounding may be used with or without the techniques mentioned above that use pre-defined interpolation filters. In other words, the techniques that eliminate or significantly reduce intermediate rounding may be used during interpolation according to one or more pre-defined interpolation filters, but could also be used with interpolation that uses a fixed interpolation filter or possibly with adaptive refinement interpolations techniques.

This disclosure recognizes coding inefficiencies that can occur due to conventional rounding of half-pixel values, and proposes techniques to improve interpolation by eliminating or reducing intermediate rounding. In this case, interpolated half-pixel values may be rounded for purposes of half-pixel interpolation. Quarter-pixel values, however, which may be generated based on one or more of the interpolated half-pixel values, may rely on non-rounded versions of the half-pixel values. This can eliminate propagation of rounding inaccuracies from the half-pixel values to the quarter-pixel values. In some cases, slight rounding may be applied to some of the half-pixel values in order to ensure that a sixteen-bit data structure can be used to store any intermediate values. In some cases, the impact of the slight rounding on the final accuracy can be zero by performing the rounding properly. In any case, the elimination or reduction of intermediate rounding may be done with or without the implementation of a plurality of pre-defined interpolation filters, as described herein.

FIG. 1 is a block diagram illustrating one exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any wireless devices that can communicate video information over a communication channel 15, in which case communication channel 15 is wireless. The techniques of this disclosure, however, which concern motion compensated interpolation, are not necessarily limited to wireless applications or settings.

In the example of FIG. 1, source device 12 may include a video source 20, video encoder 22, a modulator/demodulator (modem) 23 and a transmitter 24. Destination device 16 may include a receiver 26 a modem 27, a video decoder 28, and a display device 30. In accordance with this disclosure, video encoder 22 of source device 12 may be configured to apply one or more of the interpolation techniques of this disclosure as part of a video encoding process. Similarly, video decoder 28 of destination device 16 may be configured to apply one or more of the interpolation techniques of this disclosure as part of a video decoding process.

The illustrated system 10 of FIG. 1 is merely exemplary. The interpolation techniques of this disclosure may be performed by any encoding device that supports motion compensated interpolation to sub-pixel resolution. Source device 12 and destination device 16 are merely examples of such coding devices. In this case, source device 12 generates coded video data for transmission to destination device 16. Devices 12, 16 may operate in a substantially symmetrical manner such that each of devices 12, 16 include video encoding and decoding components, e.g., in a combined encoder-decoder (CODEC). Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. For wireless applications, transmitter 24 may include circuits designed for transmitting data, including amplifiers, filters, and one or more antennas.

Receiver 26 of destination device 16 receives information over channel 15, and modem 27 demodulates the information. Again, the video encoding process may implement one or more of the techniques described herein to improve the interpolation during motion compensation. The video decoding process performed by video decoder 28 may also perform interpolation during its motion compensation stage of the decoding process. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate according to a video compression standard, such as the ITU-T H.264 standard, alternatively described as MPEG-4, Part 10, Advanced Video Coding (AVC). The techniques of this disclosure, however, are not limited to any particular coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work extensions to H.264/MPEG-4 AVC.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined CODEC in a respective mobile device, subscriber device, broadcast device, server, or the like.

A video sequence typically includes a series of video frames. Video encoder 22 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Smaller video blocks can provide better resolution, and may be used for locations of a video frame that include high levels of detail. In general, macroblocks (MBs) and the various sub-blocks may be considered to be video blocks. In addition, a slice may be considered to be a series of video blocks, such as MBs and/or sub-blocks. Each slice may be an independently decodable unit of a video frame. Video encoder 22 and video decoder 28 perform inter-based predictive coding, which involves the generation of predictive reference data and the subtraction of a video block to be coded from the predictive reference data to generate residual data, which may then be transformed, quantized and entropy coded. The inter-based predictive coding may include interpolation of the predictive data in accordance with this disclosure.

Following inter-based predictive coding (which includes the interpolation techniques of this disclosure), and following any transforms (such as the 4×4 or 8×8 integer transform used in H.264/AVC or a discrete cosine transform DCT), quantization may be performed. Quantization generally refers to a process in which coefficients are quantized to possibly reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

According to the techniques of this disclosure, video encoder 22 may apply a plurality of pre-defined interpolation filters in order to generate a plurality of different interpolated prediction data. The interpolated prediction data that achieves the highest levels of compression may be selected by video encoder 22, and the interpolation filter that was used for the selected interpolated prediction data may be coded as syntax and communicated to destination device 16 as part of the coded video data. In this case, video decoder 28 receives the coded video data, and can interpret the syntax in order to identify the interpolation filter that was used by video encoder 22. Accordingly, video decoder 28 can identify and use the same interpolation filter during its motion compensation decoding process that was used during the encoding process. The different pre-defined interpolation filters may comprise similar filters with different sets of filter coefficients (filter taps). Alternatively, the different pre-defined interpolation filters may comprise filters having different numbers of filter taps, or possibly different types of filter configurations altogether.

Also, according to another aspect of this disclosure, video encoder 22 and video decoder 28 may apply interpolation techniques that eliminate or significantly reduce intermediate rounding of half-pixel values for quarter-pixel interpolation. In this case, video encoder 22 and video decoder 28 may round the interpolated half-pixel values purposes of half-pixel interpolation. For quarter-pixel interpolation, however, video encoder 22 and video decoder 28 may store and use non-rounded versions of the half-pixel values in order to reduce or eliminate propagation of rounding inaccuracies from the half-pixel values to the quarter-pixel values. In some cases, slight rounding may be applied to one particular half-pixel value that requires two levels of interpolation in order to ensure that a fixed size storage elements (e.g., sixteen-bit registers) can be used to store any intermediate values. In some cases, the impact of the slight rounding on the final accuracy can be made to be zero by performing the rounding properly, as described herein.

Figure 2:
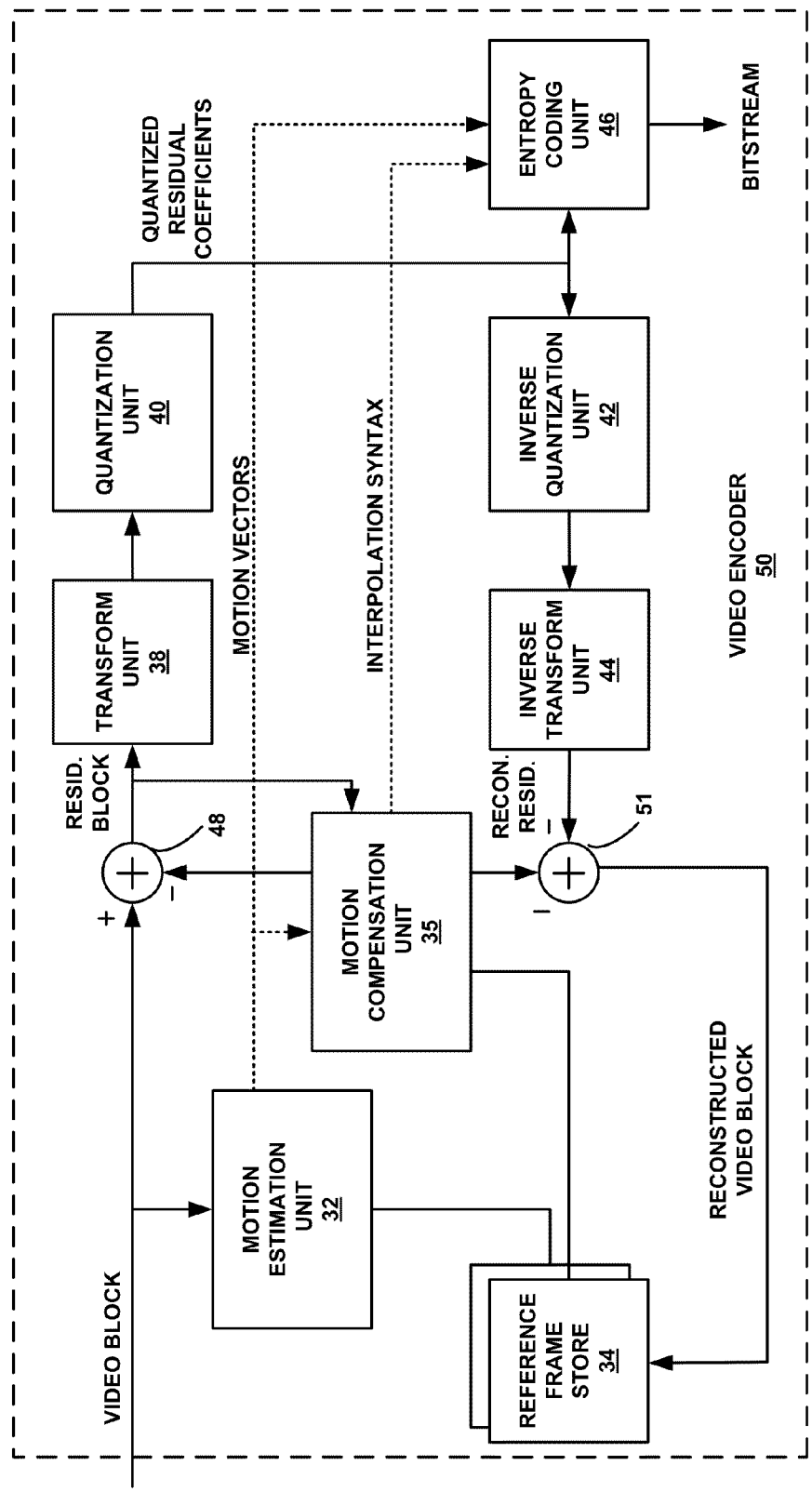
FIG. 2 is a block diagram illustrating an example of a video encoder consistent with this disclosure.

FIG. 2 is a block diagram illustrating an example of a video encoder 50 that may perform motion compensated interpolation consistent with this disclosure. Video encoder 50 may correspond to video encoder 22 of device 20, or a video encoder of a different device. Video encoder 50 may perform intra- and inter-coding of blocks within video frames, although intra-coding is not illustrated. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode and Inter-modes such as prediction (P-mode) or bi-directional (B-mode) may refer to the temporal based compression modes. The techniques of this disclosure typically may be applied during inter-coding, and therefore, intra-coding units such as spatial prediction unit are not illustrated in FIG. 2 for simplicity and ease of illustration. However, the rounding techniques of this disclosure may also be applicable to spatial prediction and intra coding techniques.

As shown in FIG. 2, video encoder 50 receives a current video block within a video frame to be encoded. In the example of FIG. 2, video encoder 50 includes motion estimation unit 32, a motion compensation unit 35, a reference frame store 34, an adder 48, a transform unit 38, a quantization unit 40, and an entropy coding unit 46. For video block reconstruction, video encoder 50 also includes an inverse quantization unit 42, an inverse transform unit 44 adder 51. A deblocking filter (not shown) may also be included to filter block boundaries to remove blockiness artifacts from reconstructed video. If desired, the deblocking filter would typically filter the output of adder 51.

During the encoding process, video encoder 50 receives a video block to be coded, and motion estimation unit 32 and motion compensation unit 35 perform inter-predictive coding. Motion estimation unit 32 and motion compensation unit 35 may be highly integrated, but are illustrated separately for conceptual purposes. Motion estimation is typically considered the process of generating motion vectors, which estimate motion for video blocks. A motion vector, for example, may indicate the displacement of a predictive block within a predictive frame (or other coded unit) relative to the current block being coded within the current frame (or other coded unit). Motion compensation is typically considered the process of fetching or generating the predictive block based on the motion vector determined by motion estimation. Again, motion estimation unit 32 and motion compensation unit 35 may be functionally integrated. The interpolation techniques described in this disclosure are described as being performed by motion compensation unit 35. However, interpolation may be performed during motion estimation in order to facilitate the selection of the best motion vectors.

In accordance with this disclosure, motion estimation 32 selects the appropriate motion vector for the video block to be coded by comparing the video block to video blocks of a predictive coded unit (e.g., a previous frame). At this point, motion compensation unit 35 may perform interpolation in order to generate predictive data at sub-pixel resolution. In some cases, during motion estimation, the interpolation may be based on a fixed interpolation filter. In other cases, the different interpolation filters applied during motion compensation (as outlined below) may also be used during the motion estimation process for purposes of motion vector selection.

Once motion estimation unit 32 has selected the motion vector for the video block to be coded, motion compensation unit 35 generates the predictive video block associated with that motion vector. According to this disclosure, however, motion compensation unit 35 may consider several versions of any predictive video block that has sub-pixel resolution. In this case, motion compensation unit 35 may apply a plurality of pre-defined interpolation filters in order to generate a plurality of different interpolated prediction data for the video block to be coded. Motion compensation unit 35 then selects the interpolated prediction data (e.g., an interpolated video block associated with one of the interpolation filters) that achieves the highest levels of compression. The interpolation filter that was used to generate the interpolated data may be coded as interpolation syntax and communicated to entropy coding unit 46 for inclusion in the coded bitstream. Once motion compensation unit 35 has selected and applied the best interpolation filter, the motion compensation unit 35 generates the predictive data using that interpolation filter, and video encoder applies adder 48 to subtract that predictive data from the video block being coded to generate residual data.

Also, according to another aspect of this disclosure, video encoder 22 and video decoder 28 may apply interpolation techniques that eliminate or significantly reduce intermediate rounding of half-pixel values for quarter-pixel interpolation. In this case, video encoder 22 and video decoder 28 may round the interpolated half-pixel values for purposes of half-pixel interpolation. For quarter-pixel interpolation, however, video encoder 22 and video decoder 28 may store and use non-rounded versions of the half-pixel values in order to reduce or eliminate propagation of rounding inaccuracies from the half-pixel values to the quarter-pixel values. In some cases, slight rounding may be applied to one particular half-pixel value that requires two levels of interpolation in order to ensure that fixed size storage elements (e.g., 16-bit registers) can be used to store any intermediate values.

As noted, once motion compensation unit 35 generated prediction data (e.g., an interpolated predictive video block), video encoder 50 forms a residual video block by subtracting the prediction data from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. For example, a 16-bit value may be rounded down to a 15-bit value during quantization. Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding methodology. Following the entropy coding by entropy coding unit 46, the encoded video may be transmitted to another device or archived for later transmission or retrieval. The coded bitstream may include entropy coded residual blocks, motion vectors for such blocks, and other syntax including the interpolation syntax that identifies the interpolation filters that were applied by motion compensation unit 35.

Inverse quantization unit 42 and inverse transform unit 44 apply inverse quantization and inverse transformation, respectively, to reconstruct the residual block in the pixel domain, e.g., for later use a reference block. Summer 51 adds the reconstructed residual block to the motion compensated prediction block produced by motion compensation unit 35 to produce a reconstructed video block for storage in reference frame store 34. The reconstructed video block may be used by motion estimation unit 32 and motion compensation unit 35 as a reference block to inter-encode a block in a subsequent video frame.

Figure 3:
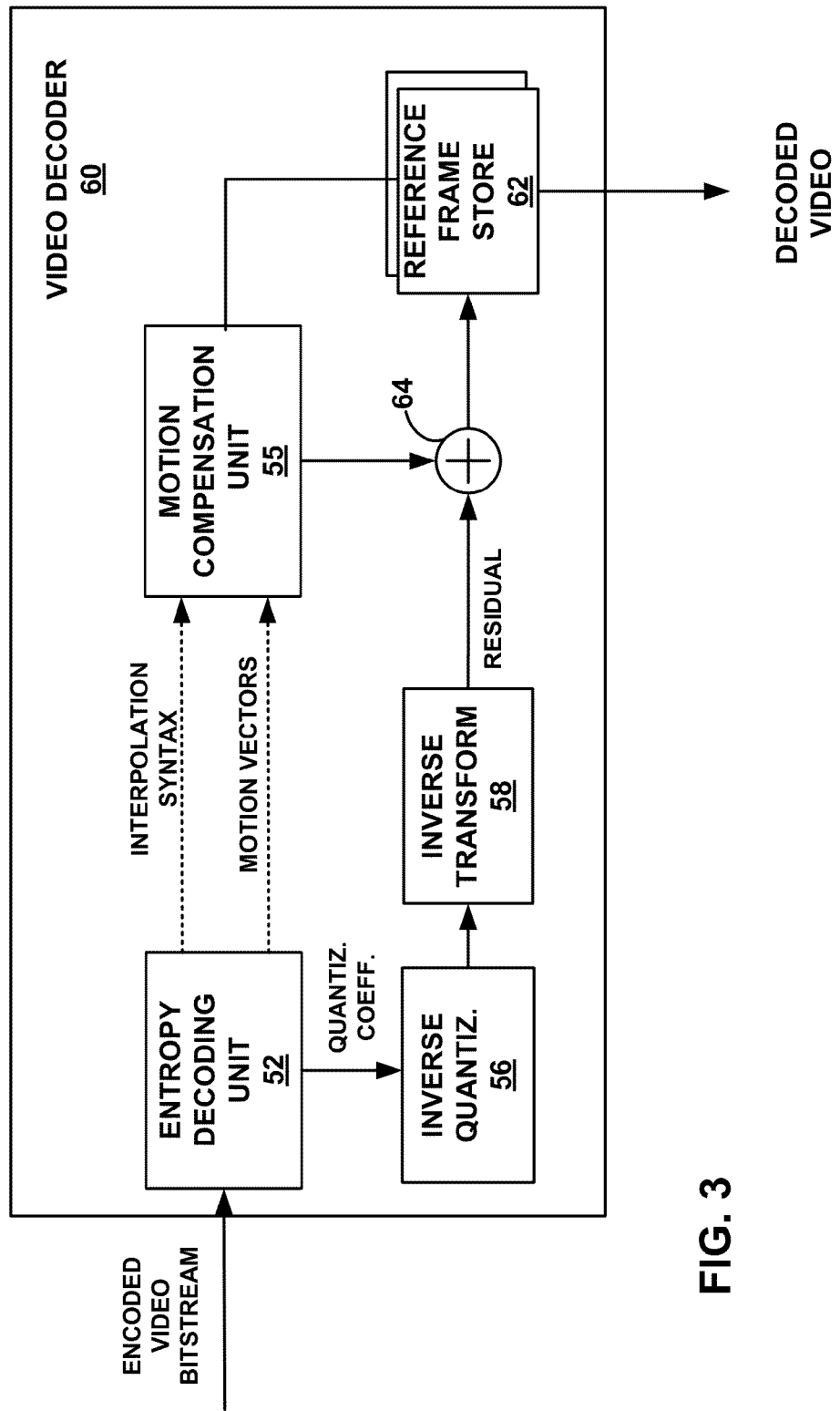
FIG. 3 is a block diagram illustrating an example of a video decoder consistent with this disclosure.

FIG. 3 is a block diagram illustrating an example of a video decoder 60, which decodes a video sequence that is encoded in the manner described herein. Video decoder 60 includes a motion compensation unit 55 that performs the interpolation techniques of this disclosure for decoding. In particular, on the decoding side, motion compensation unit 55 may receive a syntax element from entropy decoding unit 52 that identifies an interpolation filter from a plurality of different pre-defined interpolation filters. Motion compensation unit 55 may generate prediction data, which includes interpolating pixel values of reference video data based on the interpolation filter identified by the syntax element. Specifically, motion compensation unit 55 may generate the prediction data based on motion vectors received from entropy decoding unit 52 and the interpolations as defined by syntax element (labeled interpolation syntax in FIG. 3). Based on this interpolated prediction data, the video data (e.g., a reconstructed residual video block) can be decoded.

Entropy decoding unit 52 entropy decodes the received bitstream to generate quantized coefficients and the syntax (e.g., interpolation syntax and motion vectors sent to motion compensation unit 55). Inverse quantization unit 56 inverse quantizes, i.e., de-quantizes, the quantized block coefficients. The inverse quantization process may be a conventional process as defined by H.264 decoding. Inverse transform unit 58 applies an inverse transform, e.g., an inverse DCT or conceptually similar inverse transform process, to the transform coefficients in order to produce residual blocks in the pixel domain. Motion compensation unit 55 produces motion compensated blocks in the manner described herein, e.g., including interpolation based on a set of interpolation filter coefficients identified by the syntax element (i.e., the interpolation syntax).

Summer 64 decodes residual blocks by summing the residual blocks with the corresponding prediction blocks generated by motion compensation unit 55 to form decoded blocks. If desired, a deblocking filter may also be applied to filter the decoded blocks in order to remove blockiness artifacts. The decoded video blocks are then stored in reference frame store 62, which is a storage element that provides reference blocks for subsequent motion compensation and also produces decoded video to a drive display device (such as device 30 of FIG. 1).

Again, the techniques of this disclosure concern motion compensated interpolation in which pixel values of predictive video blocks are interpolated to sub-pixel resolution. The encoder uses the techniques of this disclosure to identify a desirable interpolation filter from a plurality of pre-defined interpolation filters. The different filters may be characterized by different sets of filter coefficients, different numbers of filter coefficients, or different filter types. The decoder interprets syntax elements sent from the encoder in order to identify the same desirable set of interpolation filter coefficients used by the encoder.

FIGS. 4A-4D are conceptual diagrams illustrating integer pixels and interpolated pixels that may comprise pixels of predictive video blocks. In the conceptual illustration of FIG. 4, the different boxes represent pixels. Capitalized letters (in the boxes with solid lines) represent integer pixel locations, while small letters (in the boxes with dotted lines) represent the interpolated pixel locations. The lettered labels may be used herein to describe the pixel locations, or pixel positions, or may refer to the pixel values associated with the various locations. Pixel locations "aa," "bb," "cc," "dd," "ee," "ff," "gg," "hh," "ii," and "jj," are half-pixel locations used in the fractional interpolations of various fractional locations associated with pixel location "C3."

Every pixel location may have an associated fifteen different fractional locations, e.g., in compliance with interpolations compliant with the ITU H.264/AVC standard. In the example of FIGS. 4A-4D, these 15 different fractional locations associated with pixel "C3" are illustrated. For simplicity and ease of illustration, most of the other fractional locations are not shown (other than those mentioned above, which are used to generate one or more of the 15 different fractional locations associated with pixel "C3").

In the ITU H.264/AVC standard, in order to obtain luma signals at half-pixel positions, a 6-tap Wiener filter with coefficients [1, −5, 20, 20, −5, 1] is typically used. Then, in order to obtain luma signals at quarter-pixel locations, a bilinear filter is used. The bilinear filter may also be used in fractional pixel interpolation for the chroma components, which may have up to ⅛-pixel precision in H.264/AVC.

Figure 4B:
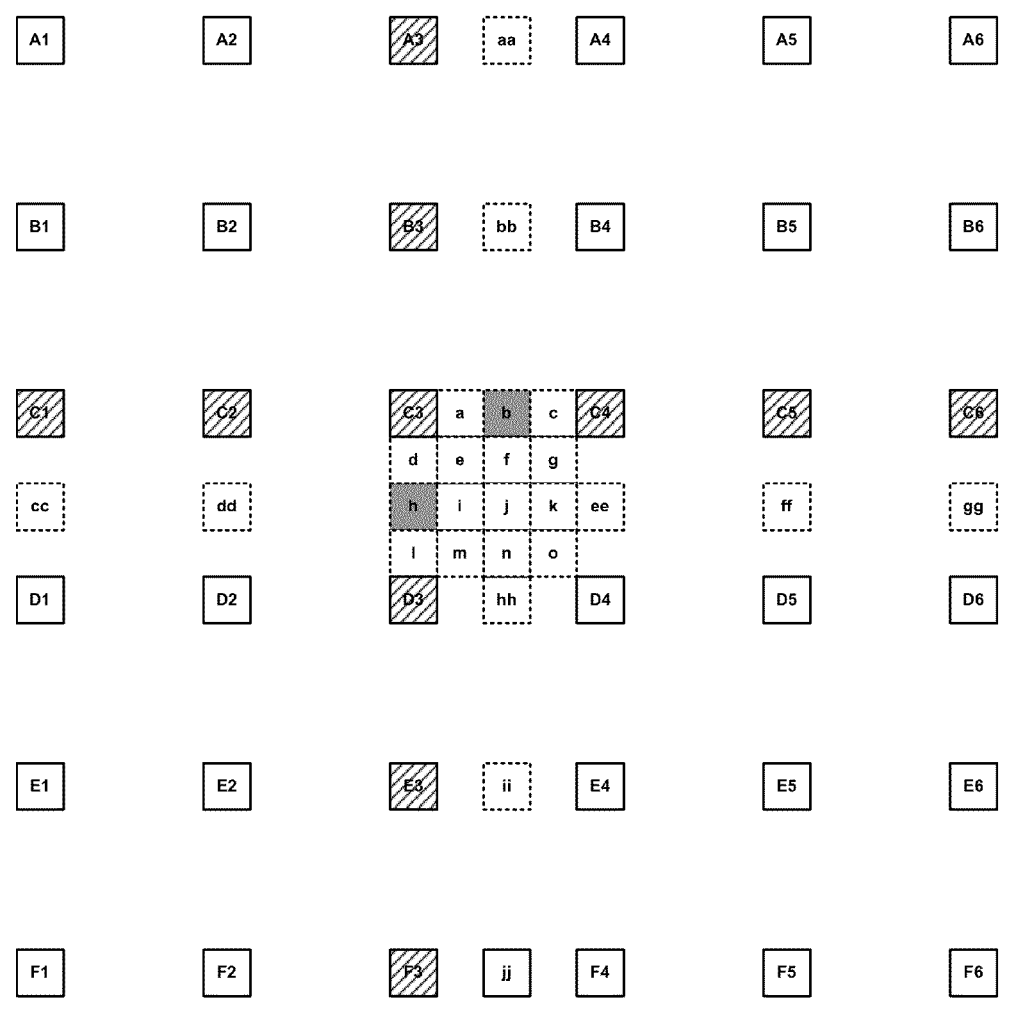

Half-pixel interpolations of pixel locations "b" and "h" are demonstrated in FIG. 4B in the horizontal and vertical directions respectively. In this case, pixel location "b" may be interpolated based on integer pixels "C1," "C2," "C3," "C4," "C5," and "C6." Similarly, pixel location "h" may be interpolated based on integer pixels "A3," "B3," "C3," "D3," "E3," and "F3." Different interpolation filters (e.g., different sets of filter taps) may be applied to generate different interpolated values of pixel locations "b" and "h" as described herein. In FIG. 4B, interpolated pixel locations "b" and "h" are shown with shading, and integer pixel locations "C1," "C2," "C3," "C4," "C5," "C6," "A3", "B3", "C3", "D3", "E3" and "F3" are shown with cross-hashes.

Figure 4C:
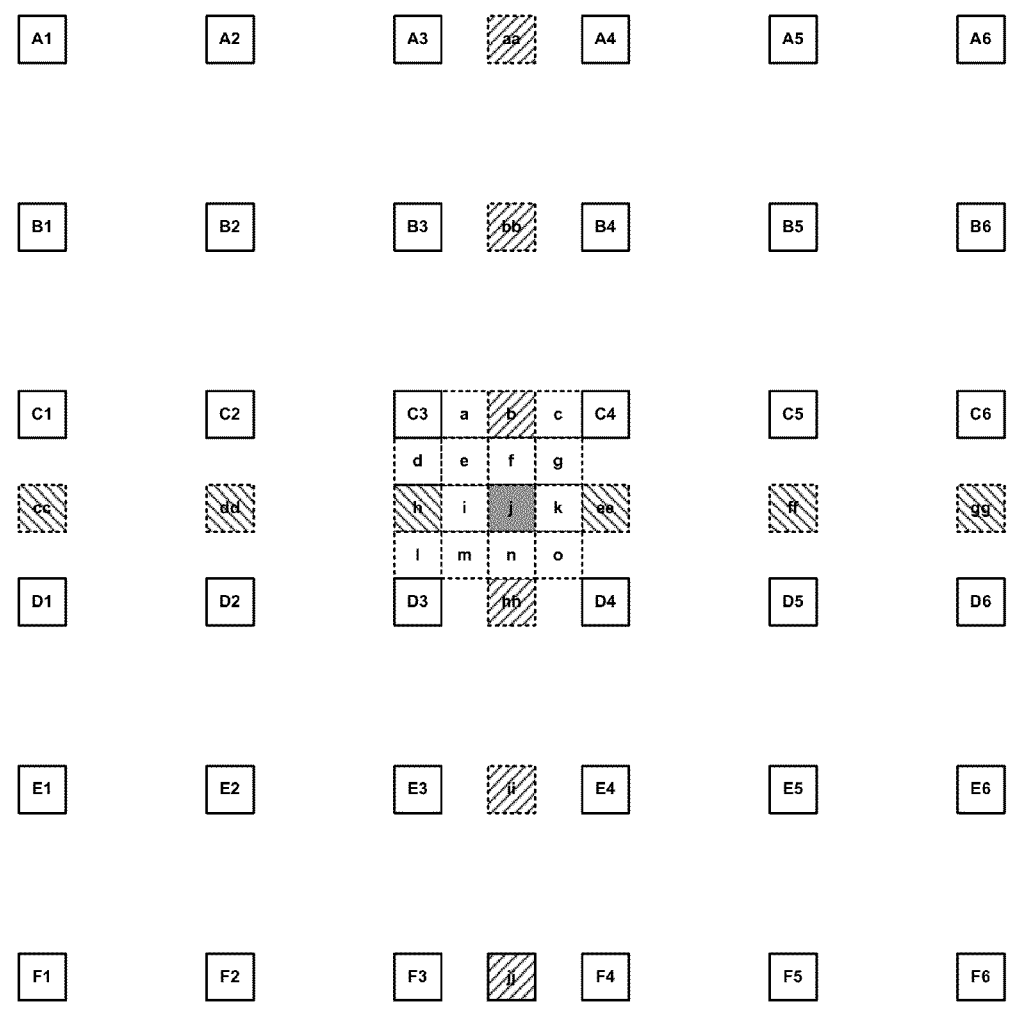

FIG. 4C illustrates one special case that may require two levels of interpolation. In particular, pixel location "j" is unlike the other half-pixel locations insofar as pixel location "j" is itself interpolated based on other half-pixel values. For example, pixel location "j" may be interpolated based on half-pixel interpolated values "cc," "dd," "h," "ee," "ff," and "gg" in the horizontal direction. Alternatively, pixel location "j" may be interpolated based on half-pixel interpolated values "aa," "bb," "b," "hh," "ii," and "jj" in the vertical direction. In FIG. 4C, interpolated pixel location "j" is shown with shading, half-pixel interpolated values "aa," "bb," "b," "hh," "ii," and "jj" in the vertical direction are shown with right-to-left cross-hashes, and half-pixel interpolated values "cc," "dd," "h," "ee," "ff," and "gg" are shown with left-to-right cross-hashes.

Figure 4D:
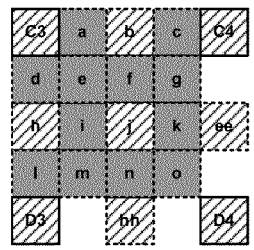

FIG. 4D illustrates quarter-pixel locations "a," "c," "d," "e," "f," "g," "i," "k," "l," "m," "n," and "o" with shading, and illustrates the integer and half-pixel locations used for such quarter-pixel interpolation (e.g., "C3," "b," "C4," "h," "j," "ee," "D3," "hh," and "D4") with cross-hashes.

After motion estimation, the best motion vector for a given video block may be identified, e.g., possibly using a rate-distortion model to balance the coding rate and quality. Then, the prediction video block is formed during motion compensation using the best motion vector. As outlined above, the residual video block is formed by subtracting the prediction video block from the original video block. A transform is then applied on the residual block, and the transform coefficients are quantized and entropy coded to further reduce bit rate.

Again, FIGS. 4A-4D show the integer-pixel samples (also called full-pixels) in the solid boxes with upper-case letters. For any given integer-pixel sample, there are altogether 15 sub-pixel positions, which are shown for integer-pixel sample "C3" and labeled "a" through "o" in FIGS. 4A-4D. In H.264/AVC, the half-pixel positions "b," "h," and "j" may be calculated first using the one-dimensional 6-tap Wiener filter. As noted, half-pixel position "j" may require two levels of this interpolation using 6-tap filtering. In this case, for pixel position "j," the interpolation filter is applied first in the horizontal direction and then in the vertical direction, possibly with intermediate rounding of interpolated pixel values after interpolation in one dimension in order to ensure that data can be stored within sixteen-bit storage elements. Remaining quarter-pixel positions are then interpolated via filtering that uses a bilinear filter and the already calculated half-pixel samples.

The ITU-T SG16/Q.6/VCEG (Video Coding Expert Group) committee has been exploring coding technologies that offer higher coding efficiency than H.264/AVC. Such exploration is done in the KTA (Key Technology Areas) forum. One of the coding tools that have been adopted into KTA is called adaptive interpolation filter (AIF). AIF offers large coding gain over H.264/AVC, especially on video sequences with high resolution (e.g., 720p). In AIF, the interpolation filter for each sub-pixel position is analytically calculated for each video frame by minimizing the prediction error energy. The analytically derived adaptive filter coefficients for each frame are then predicted, quantized, coded, and sent in the video bitstream.

The techniques of this disclosure may achieve comparable coding improvements to those achieved by AIF, while reducing implementation complexity relative to AIF. The described techniques may require no analytical process to derive the filter coefficients for each video frame. Instead, in one example, different sets of filter coefficients are pre-calculated and pre-defined for real-time application. In this case, the pre-defining of filter coefficients may be based on AIF applied to test sequences, or other selection criteria.

Three different types of AIF schemes have been adopted into KTA. The first is a two-dimensional non-separable AIF (NS-AIF), the second is a separable AIF (S-AIF), and the third is an AIF with directional filters (DAIF). However, all three AIF schemes use the same analytical process to derive the filter coefficients, which is explained below using non-separable AIF as an example.

Assume a 6×6 two-dimensional non-separable filter has coefficients $h_{i,j}^{SP}$ where i,j=0 . . . 5 and SP represents one of the 15 sub-pixel positions (a through o) shown in FIGS. 4A-4D. Note that 6 of the 15 sub-pixel positions "a,", "b," "c," "d," "h" and "l" are one-dimensional sub-pixel positions, which may use a 6-tap filter to interpolate. Also assume that the prediction pixels at the integer-pixel positions (A1 through F6 in FIGS. 4A-4D) in the reference frame take the pixel values of $P_{i,j}$ where i,j=0 . . . 5. That is, A1 takes the value of $P_{0,0}$, . . . , A6 takes the value of $P_{5,0}$, . . . , F1 takes the value of $P_{5,0}$, . . . , and F6 takes the value of $P_{5,5}$. Then, the interpolated value $p^{SP}$ at sub-pixel position SP, SP ∈ {a, . . . , o}, may be calculated using the following equation.

$$p^{SP} = \sum_{i=0}^{5} \sum_{j=0}^{5} P_{i,j} h_{i,j}^{SP}$$

Let $S_{x,y}$ be the pixel value in the current video frame at position (x, y).

$$\tilde{x} = x + \lfloor mvx \rfloor - FO, \tilde{y} = y + \lfloor mvy \rfloor - FO,$$

where (mvx,mvy) is the motion vector, ($\lfloor mvx \rfloor, \lfloor mvy \rfloor$) is the integer component of the motion vector, and FO is the filter offset. For example, in the case of 6-tap filter, FO=6/2−1=2. For each sub-pixel position SP, the prediction error energy $(e^{SP})^2$ between the actual pixel value in the current frame and the interpolated value can be accumulated for all pixels that have motion vector precision corresponding to sub-pixel position SP. The prediction error energy $(e^{SP})^2$ is calculated using the following equation:

$$(e^{SP})^2 = \sum_x \sum_y (S_{x,y} - p_{x,y}^{SP})^2 = \sum_x \sum_y \left(S_{x,y} - \sum_{i=0}^{5} \sum_{j=0}^{5} h_{i,j}^{SP} P_{\tilde{x}+i, \tilde{y}+j}\right)^2 \quad (2)$$

For each of the sub-pixel positions "a" . . . "o" an individual set of equations may be set up by computing the derivative of $(e^{SP})^2$ with respect to the filter coefficients $h_{i,j}^{SP}$. The number of equations, in this case, is equal to the number of filter coefficients used for the current sub-pel position SP. For each two-dimensional sub-pixel position "e," "f," "g," "i," "j," "k," "m," "n," and "o" using a 6×6-tap two-dimensional filter, a system of 36 equations with 36 unknowns can be solved. For the remaining sub-pixel positions "a," "b," "c," "d," "h," and "l," which may only require a one-dimensional filter, systems of 6 equations can be solved.

$$0 = \frac{(\partial e^{SP})^2}{\partial h_{k,l}^{SP}} \quad (3)$$
$$= \frac{\partial}{\partial h_{k,l}^{SP}} \left( \sum_x \sum_y \left(S_{x,y} - \sum_i \sum_j h_{i,j}^{SP} P_{\tilde{x}+i,\tilde{y}+j}\right)^2 \right)$$
$$= \sum_x \sum_y \left(S_{x,y} - \sum_i \sum_j h_{i,j}^{SP} P_{\tilde{x}+i,\tilde{y}+j}\right) P_{\tilde{x}+k,\tilde{y}+l}$$

∀ k, l ∈ {0; 5}

In summary, an example process of deriving and applying the AIF filters may have the following steps:
1. Motion vectors (Mvx, mvy) may be estimated for every video frame to be coded. During motion estimation, a fixed interpolation filter (e.g., the interpolation process of H.264/AVC) can be applied.
2. Using these motion vectors, prediction error energy for each sub-pixel position SP may be accumulated over the current video frame. Then, adaptive filter coefficients $h_{i,j}^{SP}$ can be calculated for each sub-pixel position SP independently by minimizing the prediction error energy as in the two prediction energy equations above.
3. New motion vectors can then be estimated. During this motion estimation process, the adaptive interpolation filters computed in step 2 may be applied. Using the adaptive interpolation filters, motion estimation errors, caused by aliasing, camera noise, etc., are reduced and better motion prediction may be achieved.

All three existing AIF schemes use the same analytical process as given above. The differences between these schemes mostly lie in the number of unique filter coefficients used, whether the interpolation filters are separable or not, and what filter support (i.e., integer pixel positions used to interpolate) is used. In each of these schemes, certain symmetry constraints on the AIF filters are imposed to reduce the number of filter coefficients that need to be sent in the video bitstream.

As mentioned above, in H.264/AVC, interpolation is performed with intermediate rounding operations. Conventionally, half-pixel positions ("b," "h," and "j") are filtered and rounded before they are used to obtain the quarter-pixel positions. Moreover, during bilinear filtering, which is used to obtain the quarter-pixel values, upward rounding may be used (i.e., (a+b+1)>>1 may be used in conventional bilinear filters). Such frequent and biased rounding operations may reduce precision of the interpolation filters. In particular, simulations have shown that higher-precision interpolation filters derived directly from the 6-tap Wiener filter and the bilinear filter used in H.264/AVC, provides significant gain over H.264/AVC, especially for the high definition video sequences, such as the 720p sequences. A significant portion of the gains achieved by the AIF schemes (NS-AIF, S-AIF, and DAIF) may come from the fact that these AIF schemes use higher precision filters than H.264/AVC.

In accordance with this disclosure, a relatively simple switched interpolation filter with offset (SIFO) scheme may be used. Instead of adaptively deriving the filter coefficients for each frame, which is a very costly process at the encoder side, the SIFO scheme chooses between a plurality fixed filters, e.g., which may be respectively defined by plurality of different pre-defined sets of interpolation filter coefficients. The choice of the interpolation filter may be done either on the frame level or on the sub-pixel position level, which may be referred to as a frame-based choice or sample-based choice, respectively. If desired, DC offsets may also be added after prediction, and the DC offsets may also be added on a frame basis or a sample basis. Thus, one or more DC offsets may be defined for each frame, different DC offsets (or sets of DC offsets) may be defined for different video blocks of a frame. Different DC offsets may be defined for each pixel and sub-pixel interpolated position. Frames are one example of coded units, and the phrase "frame-based choice" more broadly refers to a coded unit-based choice. In some case, slices or portions of a frame, for example, may be coded separately as individual coded units.

Different sets of fixed filters may be used by motion compensation units 35 and 55 of FIGS. 2 and 3 respectively. Examples includes a standard H.264 filter set, a filter set based on H.264/AVC but with higher precision (without intermediate rounding for half-pixel positions and biased rounding for quarter-pixel positions), or one or more sets of customized interpolation filters. The set or sets of customized interpolation filters may be obtained by using a set of training video sequences. Adaptive filters that minimize prediction error energy may be derived by applying the analytical process used in AIF schemes to the training video set. Then, the average filters for each sub-pixel position may be calculated and used as the customized interpolation filters that are applied by motion compensation units 35 and 55, as described herein.

The average filter for a particular sub-pixel position may also be normalized such that all filter coefficients add up to 1.0. The average filter may also be quantized to a certain fixed-point precision (e.g., 13-bit precision). The use of fixed-point precision in the filter coefficient ensures that implementations across different platforms will not have drifts. Furthermore, a true fixed-point implementation may be derived from such pre-defined filter coefficients. Any customized filters may have different characteristics. Specifically, different filters may be non-separable filters or separable filters, and different filters may define different filter supports (e.g., 6×6 or 4×4).

In any case, the filter set that offers best prediction in any given instance (e.g., the smallest prediction error energy) can be chosen by motion compensation unit 35 during the encoding process. Again, the filter set selection may be frame-based or sample-based meaning that filters may be selected for each frame (or other coded unit), or may be selected for different video blocks of each frame. When multiple reference frames are used, different filter sets may be selected for different reference frames. Furthermore, some reference frames may have frame-based filter selection, while other reference frames may have sample-based filter selection. When frame-based filter selection is used, and when the customized filter set is selected, the standard filters may still be applied on the half-pixel positions (e.g., positions "b," "h," and "j") while the customized filter set may be applied on the other sub-pixel positions.

Offset may also be added during interpolation. Adding DC offsets to the prediction values may help to capture illumination changes between different video frames, such as flashes, a darkening sky, and the like. In the scheme of this disclosure, DC offset may be applied on the frame-level (all pixels in the frame use the same DC offset) or on the sample position level (different pixel locations have different DC offsets). When sample-based DC offsets are used, a total of sixteen DC offsets may need to be sent in the video bitstream such that integer pixel locations and the fifteen possible non-integer pixel locations may each define different offsets. The application of sample-based DC offsets may be beneficial because it may serve as a simple but effective motion segmentation tool. Take, for example, a video frame that contains a darkening sky as still background and a moving object as the foreground. In this case, the background and the foreground may have different degrees of illumination changes, and using sample-based DC offsets may help to capture the different degrees of illumination changes in the foreground and the background.

When multiple reference frames are used, different DC offsets may be calculated and sent for different reference frames. Furthermore, some reference frames may have frame-based DC offset while others may have sample-based DC offsets. One particular scheme is to use sample-based DC offsets only on the reference frame that is closest in temporal distance to the current frame, and to use frame-based DC offset for all the other reference frames. Information may be coded in the bitstream to inform the decoder of the type of offsets used, and the magnitude of such offsets at different pixel locations.

A sub-pixel motion vector refers to a sub-pixel position in a reference picture which needs to be interpolated. H.264 defines one interpolation process for sub-pixels in which sub-pixels b and h (see FIGS. 4A-4D) may be calculated by horizontal and vertical filtering with a 6-tap filer having tap values (1, −5, 20, 20, −5, 1) as follows:

$$b1 = C1 - 5*C2 + 20*C3 + 20*C4 - 5*C5 + C6$$

where "C1," "C2," "C3," "C4," "C5" and "C6" represent the six closest integer pixels that surround "b" in the horizontal direction, with pixels "C3" and "C4" being the closest, "C2" and "C5" being the next closest, and "C1" and "C6" being the next closest.

$$h1 = A3 - 5*B3 + 20*C3 + 20*D3 - 5*E3 + F3$$

where "A3," "B3," "C3," "D3," "E3" and "F3" represent the six closest integer pixels that surround "h" in the vertical direction, with pixels "C3" and "D3" being the closest, "B3" and "E3" being the next closest, and "A3" and "F3" being the next closest.

In this case, the values of "b" and "h" may be defined as:

$$b = \max(0, \min(255, (b1+16) >> 5))$$

$$h = \max(0, \min(255, (h1+16) >> 5))$$

where ">>" is a right-shift operation. In this disclosure, ">>" represents a right shift operation and "<<" represents a left shift operation.

To interpolate sub-pixel "j," an intermediate value "j1" is first derived as:

$$j1 = aa1 - 5*bb1 + 20*b1 + 20*hh1 - 5*ii1 + jj1,$$

where the intermediate values denoted as "aa1," "bb1," "hh1," "ii1" and "jj1" are derived by applying the 6-tap filter horizontally in the same manner as the calculation of b1 at the positions of "aa," "bb," "hh," "ii" and "jj." The final value j may be calculated as:

$$j = \max(0, \min(255, (j1+512) >> 10)).$$

The pixels at quarter-pixel positions labeled as "a," "c," "d," "l," "f," "i," "k," and "n" may be derived according to Table 1 by averaging the two nearest pixels at integer and half-pixel positions and then applying upward rounding.

TABLE 1

| |
|---|
| a = (C3 + b + 1) >> 1 |
| c = (C4 + b + 1) >> 1 |
| d = (C3 + h + 1) >> 1 |
| l = (D3 + h + 1) >> 1 |
| f = (j + b + 1) >> 1 |
| i = (j + h + 1) >> 1 |
| k = (j + ee + 1) >> 1 |
| n = (j + hh + 1) >> 1 |

The pixels at quarter-pixel positions labeled as "e," "g," "m," and "o" are calculated according to Table 2 by averaging the two nearest pixels at half-pixel positions in the diagonal direction and then applying upward rounding.

TABLE 2

| |
|---|
| e = (b + h + 1) >> 1 |
| g = (b + ee + 1) >> 1 |
| m = (h + hh + 1) >> 1 |
| o = (ee + hh + 1) >> 1 |

The final values of those quarter-pixels may be finally clipped to values in the interval (0,255).

In order to keep the highest possible precision through the intermediate steps, any shifting, rounding and clipping operations may be avoided until the very last step of the interpolation process. Unlike in the H.264 standard defined implementation, the pixels at quarter-pixel positions labeled as "a," "c," "d," "l," "f," "i," "k," and "n" are derived according to Table 3 by averaging the two nearest pixels at integer and half-pixel positions "b," "h," "j," "ee" and "hh," with upward rounding.

TABLE 3

$a = (C3 << 5 + b1 + 32) >> 6$
$c = (C4 << 5 + b1 + 32) >> 6$
$d = (C3 << 5 + h1 + 32) >> 6$
$l = (D3 << 5 + h1 + 32) >> 6$
$f = (j1 >> 5 + b1 + 32) >> 6$
$i = (j1 >> 5 + h1 + 32) >> 6$
$k = (j1 >> 5 + ee1 + 32) >> 6$
$n = (j1 >> 5 + hh1 + 32) >> 6$

In this case, the intermediate values denoted as "ee1" and "hh1" are derived by applying the 6-tap filter vertically and horizontally in the same manner as the calculation of "h1" and "b1" listed above, but at the positions of "ee" and "hh." Rounding may be avoided at this stage in the generation of "ee1" and "hh1" as described herein.

The pixels at quarter-pixel positions labeled as "e," "g," "m," and "o" may be calculated according to Table 4 by averaging the two nearest pixels at half-pixel positions in the diagonal direction with upward rounding.

TABLE 4

$e = (b1 + h1 + 32) >> 6$
$g = (b1 + ee1 + 32) >> 6$
$m = (h1 + hh1 + 32) >> 6$
$o = (ee1 + hh1 + 32) >> 6$

The final values of those quarter-pixels may be clipped to values in the range (0,255). By preserving the full precision of the intermediate values, the interpolated sub-pixels will be more accurate. In particular, half-pixel values at locations "b," "h," "ee," and "hh" may be unrounded values denoted as "b1," "h1," "ee1," and "hh1" for purposes of quarter-pixel generation.

Unfortunately, interpolation of value "j" can be more complicated since the interpolation at position j requires two levels of half-pixel interpolation. In particular, to interpolate "j," twenty bits may be required to represent the intermediate value "j1." In this case, the intermediate version "j1" of "j" may be rounded to fit within sixteen bits. In this case, the operations discussed above may be implemented with minor modification so that all operations can fit within sixteen bit data structures without sacrificing precision. The interpolation of "b" and "h" may be the same as that defined above, except that their intermediate versions "b1" and "h1" may be stored for other sub-pixel interpolation. The following Tables show the interpolation process for other sub-pixels in sixteen bit storage elements. In the Tables below, the operations defined in each column are performed sequentially through the respective table. Shaded rows contain operations that are performed at the end of the process, and are not used for interpolation of other sub-pixel positions.

TABLE 5

| | positions {a, c, d, l} of FIGS. 4A-4D | | | |
|---|---|---|---|---|
| Operation | Comment | Min value | Max value | Register size |
| r1 = x | r1 is integer pixel x | 0 | 255 | 8u |
| r1 = r1 << 5 | r1 is 32 * x | 0 | 8160 | 13u |
| r2 = y0 | r2 is y0 (y0 is a one-dimensional (1-D) half-pixel such as b1, h1, ee1 and hh1 before shifting down) | −2550 | 10710 | 15s |
| r1 = r1 + r2 | r1 is 32 * x + y0 | −2550 | 18870 | 16s |
| r1 = r1 + 32 | r1 is 32 * x + y0 + 32 | −2518 | 18902 | 16s |
| r1 = r1 >> 6 | r1 is (32 * x + y0 + 32) >> 6 | −39 | 295 | 11s |
| r1 = max(0, r1) | clip r1 on the low side | 0 | 295 | 10u |
| r1 = min(255, r1) | clip r1 on the high side | 0 | 255 | 8u |

TABLE 6

| | positions {e, g, m, o} of FIGS. 4A-4D | | | |
|---|---|---|---|---|
| Operation | Comment | Min value | Max value | Register size |
| r1 = y0 | r1 is y0 (y0 is a 1-D half-pixel such as b1, h1, ee1 and hh1 before shifting down) | −2550 | 10710 | 15s |
| r2 = y1 | r2 is y1 (y1 is a 1-D half-pixel such as b1, h1, ee1 and hh1 before shifting down) | −2550 | 10710 | 15s |
| r1 = r1 + r2 | r1 is y0 + y1 | −5100 | 21420 | 16s |
| r1 = r1 + 32 | r1 is y0 + y1 + 32 | −5068 | 21452 | 16s |
| r1 = r1 >> 6 | r1 is (y0 + y1 + 32) >> 6 | −79 | 335 | 11s |
| r1 = max(0, r1) | clip r1 on the low side | 0 | 335 | 10u |
| r1 = min(255, r1) | clip r1 on the high side | 0 | 255 | 8u |

Table 7, below, illustrates a sixteen-bit implementation of deriving pixel value at pixel location "j." All 1-D half-pixels "aa1," "bb1," "b1," "hh1," "ii1" and "jj1" are obtained without any shift down. The clipping range to avoid overflow is (−2372,18640). Again shaded rows in the table indicate operations that are only performed at the end of the interpolation process, and these results are not used for the interpolation of other sub-pixel positions. The intermediate value "j1" will be saved for the interpolation of "f," "i," "k" and "n."

TABLE 7 position {j} of FIGS. 4A-4D

| Operation | Comment | Min value | Max value | Register size |
|---|---|---|---|---|
| r1 = y0 | y0 is 1-D half-pixel aa1 before shifting down | -2550 | 10710 | 15s |
| r2 = y5 | y5 is 1-D half-pixel jj1 before shifting down | -2550 | 10710 | 15s |
| r1 = r1 + r2 | r1 is y0 + y5 | -5100 | 21420 | 16s |
| r2 = y1 | y1 is 1-D half-pixel bb1 before shifting down | -2550 | 10710 | 15s |
| r3 = y4 | y4 is 1-D half-pixel ii1 before shifting down | -2550 | 10710 | 15s |
| r2 = r2 + r3 | r2 is y1 + y4 | -5100 | 21420 | 16s |
| r1 = r1 - r2 | r1 is (y0 + y5) - (y1 + y4) | -26520 | 26520 | 16s |
| r1 = r1 >> 2 | r1 is ((y0 + y5) - (y1 + y4)) >> 2 | -6630 | 6630 | 14s |
| r3 = y2 | y2 is 1-D half-pixel b1 before shifting down | -2550 | 10710 | 15s |
| r4 = y3 | y3 is 1-D half-pixel hh1 before shifting down | -2550 | 10710 | 15s |
| r3 = r3 + r4 | r3 is y2 + y3 | -5100 | 21420 | 16s |
| r3 = max (-2372, r3) | clip r3 to avoid overflow (low side) | -2372 | 21420 | 16s |
| r3 = min (18640, r3) | clip r3 to avoid overflow (high side) | -2372 | 18640 | 16s |
| r2 = r3 - r2 | r2 is (y2 + y3) - (y1 + y4) | -23792 | 23740 | 16s |
| r1 = r1 + r2 | r1 is ((y0 + y5) - 5 * (y1 + y4) + 4 * (y2 + y3)) >> 2 | -30422 | 30370 | 16s |
| r1 = r1 >> 2 | r1 is ((y0 + y5) - 5 * (y1 + y4) + 4 * (y2 + y3)) >> 4 | -7605 | 7592 | 14s |
| r1 = r1 + r3 | r1 is ((y0 + y5) - 5 * (y1 + y4) + 20 * (y2 + y3)) >> 4 | -9977 | 26232 | 16s |
| j1 = r1 | store result | | | |
| r1 = r1 + 32 | r1 is ((y0 + y5) - 5 * (y1 + y4) + 20 * (y2 + y3) + 512) >> 4 | -9945 | 26264 | 16s |
| r1 = r1 >> 6 | r1 is ((y0 + y5) - 5 * (y1 + y4) + 20 * (y2 + y3) + 512) >> 10 | -155 | 410 | 10s |
| r1 = max (0, r1) | clip r1 on the low side | 0 | 410 | 9u |
| r1 = min (255, r1) | clip r1 on the high side | 0 | 255 | 8u |

Table 8, below demonstrates steps that can be taken for sixteen-bit implementation of interpolating {f,i,k,n}, which are the positions that use to interpolate the intermediate value "j1."

TABLE 8 positions {f, i, k, n} of FIGS. 4A-4D

| Operation | Comment | Min value | Max value | Register size |
|---|---|---|---|---|
| r1 = y0 | r1 is y0 (1-D half-pixel such as b1, h1, ee1 and hh1 before shifting down) | -2550 | 10710 | 15s |

TABLE 8-continued positions {f, i, k, n} of FIGS. 4A-4D

| Operation | Comment | Min value | Max value | Register size |
|---|---|---|---|---|
| r2 = j1 | r2 is j1 (2-D half-pixel j1 before shifting down) | -9914 | 26232 | 16s |
| r2 = r2 >> 1 | r2 is j1 >> 1 | -4957 | 13116 | 15s |

TABLE 8-continued positions {f, i, k, n} of FIGS. 4A-4D

| Operation | Comment | Min value | Max value | Register size |
|---|---|---|---|---|
| r1 = r1 + r2 | r1 is y0 + (j1 >> 1) | -7507 | 23826 | 16s |
| r1 = r1 + 32 | r1 is y0 + (j1 >> 1) + 32 | -7491 | 23842 | 16s |
| r1 = r1 >> 6 | r1 is (y0 + (j1 >> 1) + 32) >> 6 | -235 | 745 | 11s |
| r1 = max(0, r1) | clip r1 on the low side | 0 | 745 | 10u |
| r1 = min(255, r1) | clip r1 on the high side | 0 | 255 | 8u |

In short, the discussion above demonstrates a complete technique for interpolating every possible sub-pixel location "a," "b," "c," "d," "e," "f," "g," "h," "i," "j," "k," "l," "m," "n,"

and "o" without exceeding sixteen-bit storage elements, which is desirable for an implementation. Most intermediate half-pixel values remain unrounded for purposes of quarter-pixel interpolation. However, pixel location "j" is a special case that may require rounding of intermediate results for purposes of generating its half-pixel value since pixel location "j" requires two levels of half-pixel interpolation. In accordance with this disclosure, however, the rounding in pixel location "j" will not impact the accuracy of the final value of quarter-pixels which rely on "j."

Figure 5:
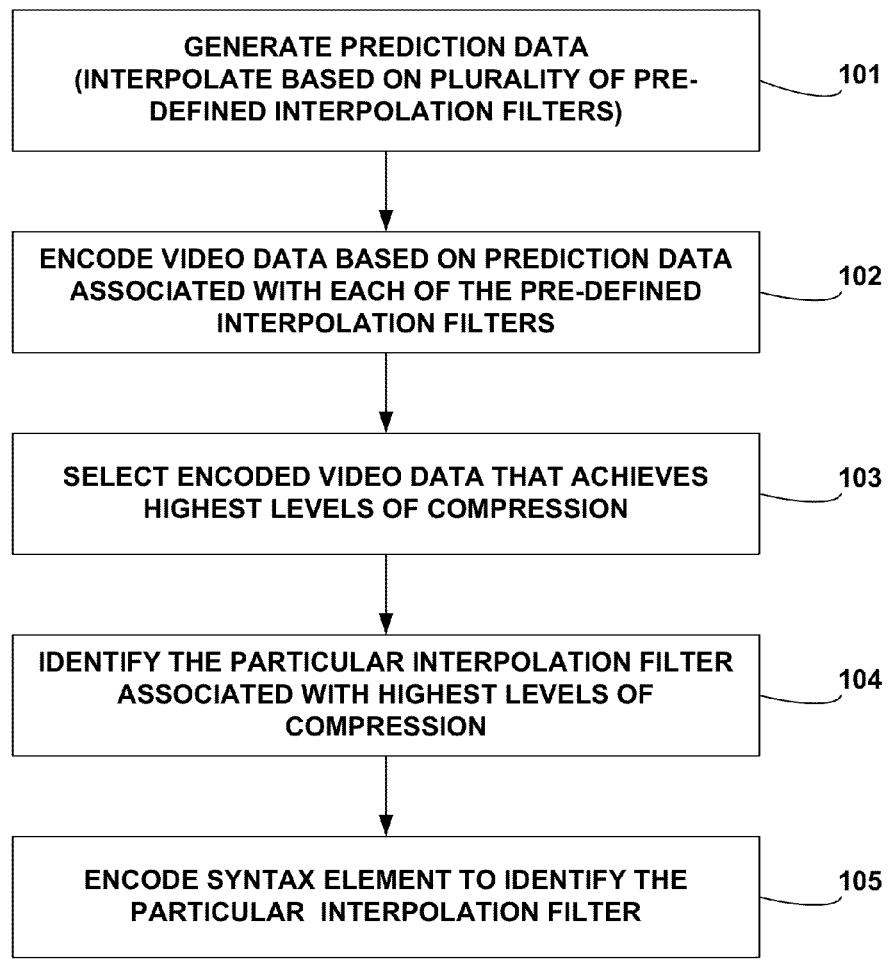
FIGS. 5-8 are flow diagrams illustrating techniques consistent with this disclosure.

FIG. 5 is a flow diagram consistent with one or more aspects of video encoding consistent with this disclosure. FIG. 5 will be discussed from the perspective of video encoder 50 shown in FIG. 2. In particular, motion compensation unit 35 generates prediction data (101), which includes interpolating based on a plurality of pre-defined interpolation filters. Motion compensation unit 35 then encodes video data, e.g., a video block, based on the prediction data associated with each of the pre-defined interpolation filters (102). For example, motion compensation unit 35 may invoke adder 48 to generate residual blocks associated with each of the pre-defined interpolation filters so that the different residual blocks can be compared to one another to find the best residual block. Motion compensation unit 35 selects the video data that achieves the highest levels of compression (103). In particular, the selected video data is illustrated as the "resid. block" output of adder 48, which is the final output. This final output of adder 48 is transformed by transform unit 38, quantized by quantization unit 40, and entropy coded by entropy coding unit 46.

Motion compensation unit 35 also identifies the particular interpolation filter that was associated with the selected residual video data that achieved the highest levels of compression (104). Motion compensation unit 35 forwards an interpolation syntax element to entropy coding unit 46. The interpolation syntax element identifies the particular interpolation filter that was used. Entropy coding unit 46 encodes the syntax element (105) to form part of the output bitstream. In this way, the interpolation filter used at encoder 50 (e.g., the filter coefficients used, or other filter designs or parameters) can be communicated to a destination device so that the destination device can perform the proper interpolation filtering during video reconstruction.

Interpolation filtering may be defined on a frame-by-frame basis, or may be defined on a video block-by-video block basis. In still other cases, the interpolation filtering may be defined on a sample-by-sample basis, or may be defined on a sub-sample by sub-sample basis. The term "video units" may refer to video frames, video blocks, video samples, or video sub-samples. In any case, video encoder 50 may encode different syntax elements to identify different interpolation filters for different reference video units that are used to generate the predictive data for different coded units of the video data. Alternatively, video encoder may encode different syntax elements to identify different interpolation filters that are used for different video blocks of the reference video data. In any case, the interpolation filters may be pre-defined using test video sequences. In this case, for example, adaptive interpolation filtering (AIF) may be applied to the video sequences in order to define different interpolation filters that achieve desirable results, and these interpolation filters may be programmed into motion compensation unit 35.

Figure 6:
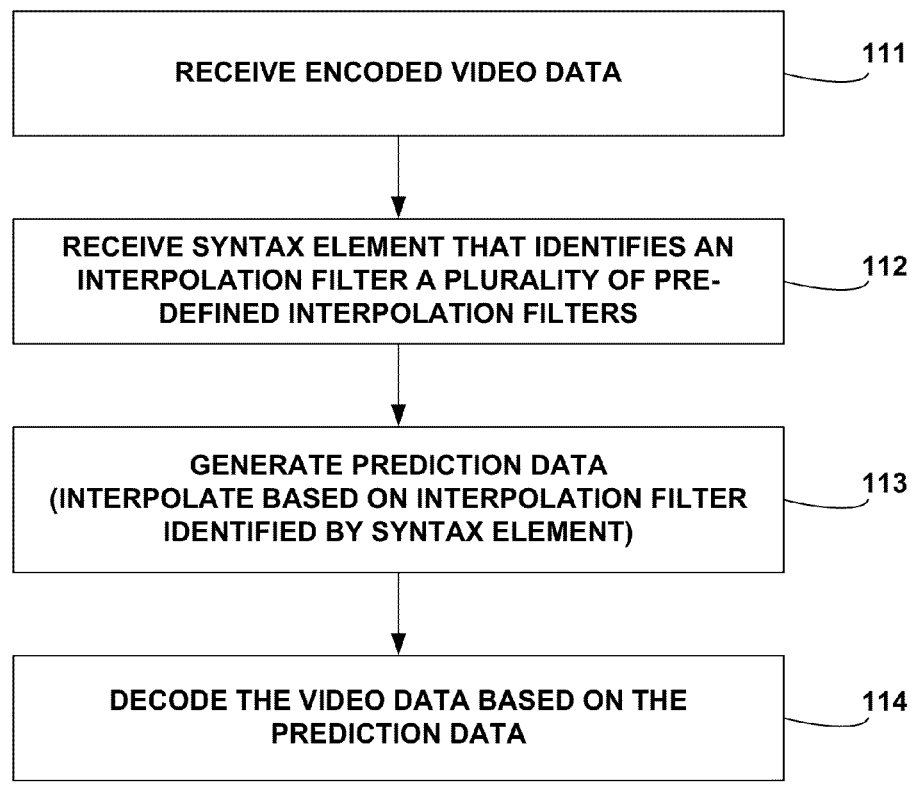

FIG. 6 is a flow diagram consistent with one or more aspects of video decoding consistent with this disclosure. FIG. 6 will be discussed from the perspective of video encoder 50 shown in FIG. 2. In particular, video encoder 60 receives an encoded video data (111), and receives a syntax element that identifies an interpolation filter from a plurality of interpolation filters (112). The encoded bitstream may include both the encoded residual video data and the syntax element that identifies the interpolation filter that was used at the encoder. Entropy decoding unit 52 may entropy decode the received bitstream to parse out the transformed and quantized residual blocks, which are sent to inverse transform quantization unit 56 and inverse transform unit 58, and to parse out the interpolation syntax element and motion vectors, which are sent to motion compensation unit 55.

Motion compensation unit 55 generates prediction data (113), which includes interpolations based on the interpolation filter identified by the syntax element. Video decoder 60 decodes the video data based on the prediction data (114). In particular, the prediction data generated by motion compensation unit 55 may be combined with residual data via adder 64 to reconstruct the video data in the pixel domain. Decoded video may then be stored in reference frame store 62 for subsequent use in prediction, and may also be output for presentation to the user, e.g., via a display or other output device.

As with the encoding, interpolation filtering during the decoding process may be defined on a frame-by-frame basis, or may be defined on a video block-by-video block basis, a sample-by-sample basis, or a sub-sample by sub-sample basis. In particular, video decoder 60 may decode different syntax elements to identify different interpolation filters for different reference video units that are used to generate the predictive data for different coded units of the video data, or alternatively, video decoder 60 may decode different syntax elements to identify different interpolation filters that are used for different video blocks of the reference video data. In any case, the interpolation filters may be pre-defined using test video sequences, and these interpolation filters may be programmed into motion compensation unit 55 so that syntax can be used to identify and invoke the proper interpolation filter within motion compensation unit 55.

Figure 7:
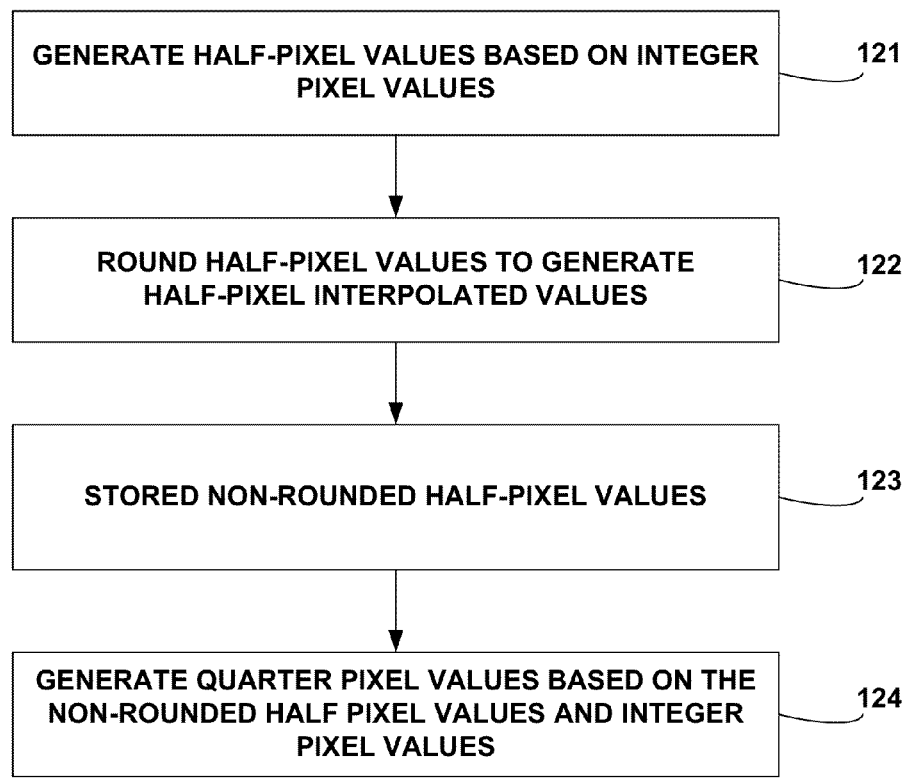

FIG. 7 illustrates an interpolation technique that may be performed by motion compensation unit 35 during the encoding process, or by motion compensation unit 55 during the decoding process. As shown in FIG. 7, motion compensation unit 35 or 55 generates half-pixel values based on integer pixel values (121). For example, these half-pixel values may correspond to pixel values at locations "b" and "h" of FIGS. 4A-4D. Motion compensation unit 35 or 55 rounds these half-pixel values to generate half-pixel interpolated values (122), but also stores non-rounded versions of the half-pixel values (123). Motion compensation units 35 and 55 may have storage elements to facilitate this temporary storage of intermediate values corresponding to the non-rounded versions of the half-pixel values. Motion compensation unit 35 or 55 can then generate quarter-pixel values based on the non-rounded half-pixel values and integer pixel values (124). These quarter-pixel values, for example, may correspond to locations "a," "c," "d," and "l" shown in FIGS. 4A-4D.

Figure 8:
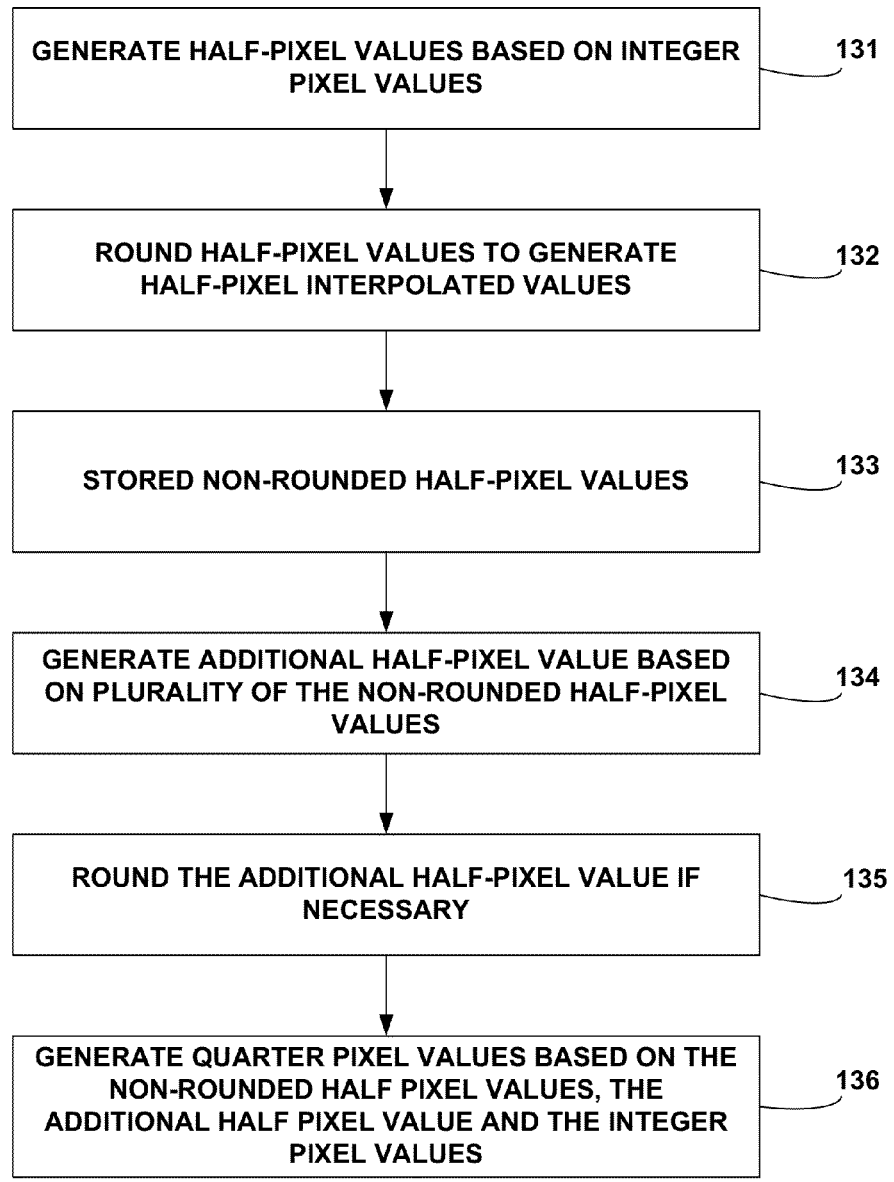

As explained above, half-pixel values at location "j" in FIGS. 4A-4D may require some rounding of intermediate values since location "j" may require two levels of half-pixel interpolations. FIG. 8 illustrates an interpolation technique that may be performed by motion compensation unit 35 during the encoding process, or by motion compensation unit 55 during the decoding process in order to generate all of the interpolated values ("a through o" shown in FIGS. 4A-4D) within a fixed-bit implementation, such as sixteen bits.

Like the process of FIG. 7, the process of FIG. 8 begins with motion compensation unit 35 or 55 generating half-pixel values based on integer pixel values (131), e.g., which may correspond to pixel values at locations "b" and "h" of FIGS. 4A-4D. Motion compensation unit 35 or 55 then rounds these half-pixel values to generate half-pixel interpolated values (132), but also stores non-rounded versions of the half-pixel values (133).

Next, motion compensation unit 35 or 55 generates an additional half-pixel value (e.g., the value corresponding to location "j" in FIGS. 4A-4D) based on the non-rounded half-pixel values. Motion compensation unit 35 or 55 rounds the additional half-pixel value (e.g., the value corresponding to location "j" in FIGS. 4A-4D), if necessary, to ensure that this value falls within a fixed bit depth (e.g., within sixteen bits) (135) without sacrificing the accuracy of quarter-pixels relying on "j." Motion compensation unit 35 or 55 can then generate quarter-pixel values based on the non-rounded half-pixel values, the additional half-pixel values and the integer pixel values (136). In this way, all of the quarter-pixel values shown with shading in FIG. 4D (e.g., locations "a," "c," "d," "e," "f," "g," "i," "k," "l," "m," "n" and "o" can be generated. The tables and discussion above provides more specific details on the operations that may be performed in this process.

The techniques of FIGS. 7 and 8 may apply to many different interpolation contexts. In particular, these techniques may be used with or without the other techniques described herein that use pre-defined interpolation filters. In other words, the techniques of FIGS. 7 and 8 that eliminate or significantly reduce intermediate rounding may be used during interpolation according to one or more pre-defined interpolation filters, but could also be used with interpolation that uses a fixed interpolation filter or possibly with adaptive refinement interpolations techniques. Accordingly, the different techniques described herein are not necessarily need to be performed together, but may have desirable application in many different interpolation settings or situations.

The techniques of this disclosure may be embodied in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units, etc.

Accordingly, the techniques described herein may be implemented in hardware, software, firmware, or any combination thereof. If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of interpolating video data to generate predictive video data for video coding, the method comprising:
   generating half-pixel values based on integer pixel values;
   rounding the half-pixel values to generate half-pixel interpolated values, wherein a first set of predictive video data comprises the half-pixel interpolated values generated by rounding the half-pixel values;
   storing the half-pixel values as non-rounded versions of the half-pixel values; and
   generating quarter-pixel values based on the non-rounded versions of the half-pixel values and the integer pixel values, wherein a second set of predictive video data that is different than the first set of predictive video data comprises the quarter-pixel values generated based on the non-rounded versions of the half-pixel values and the integer pixel values;
   generating a first rounded version of another half-pixel value based on a plurality of the non-rounded versions of the half-pixel values;
   rounding the first rounded version of the another half-pixel value to generate a second rounded version of the another half-pixel value, wherein the first set of predictive video data further comprises the second rounded version of the another half-pixel value generated by rounding the first rounded version of the another half-pixel value; and
   generating additional quarter-pixel values based on the first rounded version of the another half-pixel value and the non-rounded versions of the half-pixel values, wherein the second set of predictive video data further comprises the additional quarter-pixel values generated based on the first rounded version of the another half-pixel value and the non-rounded versions of the half-pixel values.

2. The method of claim 1, wherein every one of the values can be stored within a sixteen-bit data structure, and wherein generating the first rounded version of the another half-pixel value comprises generating the first rounded version of the another half-pixel value so that the first rounded version of the another half-pixel value can be stored within the sixteen-bit data structure.

3. The method of claim 1, further comprising:
   encoding one or more video blocks based on the integer pixel values, the half-pixel values and/or the quarter-pixel values.

4. The method of claim 1, further comprising:
   decoding one or more video blocks based on the integer pixel values, the half-pixel values and/or the quarter-pixel values.

5. The method of claim 1, further comprising using one or more of the first set of predictive video data and the second set of predictive video data for motion compensation.

6. The method of claim 1, wherein generating the first rounded version of the another half-pixel comprises generating the first rounded version of the another half-pixel value based on clipped versions of a first plurality of the non-rounded versions of the half-pixel values and non-clipped versions of a second plurality of the non-rounded versions of the half-pixel values.

7. An apparatus that interpolates video data to generate predictive video data for video coding, wherein the apparatus includes a motion compensation unit configured to:
   generate half-pixel values based on integer pixel values;
   round the half-pixel values to generate half-pixel interpolated values, wherein a first set of predictive video data comprises the half-pixel interpolated values generated by rounding the half-pixel values;
   store the half-pixel values as non-rounded versions of the half-pixel values;
   generate quarter-pixel values based on the non-rounded versions of the half-pixel values and the integer pixel values, wherein a second set of predictive video data that is different than the first set of predictive video data comprises the quarter-pixel values generated based on the non-rounded versions of the half-pixel values and the integer pixel values;
   generate a first rounded version of another half-pixel value based on a plurality of the non-rounded versions of the half-pixel values;
   round the first rounded version of the another half-pixel value to generate a second rounded version of the another half-pixel value, wherein the first set of predictive video data further comprises the second rounded version of the another half-pixel value generated by rounding the first rounded version of the another half-pixel value; and
   generate additional quarter-pixel values based on the first rounded version of the another half-pixel value and the non-rounded versions of the half-pixel values, wherein the second set of predictive video data further comprises the additional quarter-pixel values generated based on the first rounded version of the another half-pixel value and the non-rounded versions of the half-pixel values.

8. The apparatus of claim 7, wherein every one of the values can be stored within a sixteen-bit data structure, and wherein the motion compensation unit is configured to generate the first rounded version of the another half-pixel value so that the first rounded version of the another half-pixel value can be stored within the sixteen-bit data structure.

9. The apparatus of claim 7, wherein the apparatus comprises a video encoder that includes the motion compensation unit, wherein the video encoder is configured to:
   predictively encode one or more video blocks based on the integer pixel values, the half-pixel values and/or the quarter-pixel values.

10. The apparatus of claim 7, wherein the apparatus comprises a video decoder that includes the motion compensation unit, wherein the video decoder is configured to:
   predictively decode one or more video blocks based on the integer pixel values, the half-pixel values and/or the quarter-pixel values.

11. The apparatus of claim 7, wherein the apparatus comprises an integrated circuit.

12. The apparatus of claim 7, wherein the apparatus comprises a microprocessor.

13. The apparatus of claim 7, wherein the motion compensation unit is further configured to use one or more of the first set of predictive video data and the second set of predictive video data for motion compensation.

14. The apparatus of claim 7, wherein the motion compensation unit is configured to generate the first rounded version of the another half-pixel based on clipped versions of a first plurality of the non-rounded versions of the half-pixel values and non-clipped versions of a second plurality of the non-rounded versions of the half-pixel values.

15. A non-transitory computer-readable storage medium comprising instructions that upon execution cause a device to interpolate video data to generate predictive video data for video coding, wherein the instructions cause the device to:
   generate half-pixel values based on integer pixel values;
   round the half-pixel values to generate half-pixel interpolated values, wherein a first set of predictive video data comprises the half-pixel interpolated values generated by rounding the half-pixel values;
   store the half-pixel values as non-rounded versions of the half-pixel values; and
   generate quarter-pixel values based on the non-rounded versions of the half-pixel values and the integer pixel values, wherein a second set of predictive video data that is different than the first set of predictive video data comprises the quarter-pixel values generated based on the non-rounded versions of the half-pixel values and the integer pixel values;
   generate a first rounded version of another half-pixel value based on a plurality of the non-rounded versions of the half-pixel values;
   round the first rounded version of the another half-pixel value to generate a second rounded version of the another half-pixel value, wherein the first set of predictive video data further comprises the second rounded version of the another half-pixel value generated by rounding the first rounded version of the another half-pixel value; and
   generate additional quarter-pixel values based on the first rounded version of the another half-pixel value and the non-rounded versions of the half-pixel values, wherein the second set of predictive video data further comprises the additional quarter-pixel values generated based on the first rounded version of the another half-pixel value and the non-rounded versions of the half-pixel values.

16. The non-transitory computer-readable storage medium of claim 15, wherein every one of the values can be stored within a sixteen-bit data structure, and wherein the instructions that cause the device to generate the first rounded version of the another half-pixel value comprise instructions that cause the device to generate the first rounded version of the another half-pixel value so that the first rounded version of the another half-pixel value can be stored within the sixteen-bit data structure.

17. The non-transitory computer-readable storage medium of claim 15, further comprising instructions that upon execution cause the device to:
   encode one or more video blocks based on the integer pixel values, the half-pixel values and/or the quarter-pixel values.

18. The non-transitory computer-readable storage medium of claim 15, further comprising instructions that upon execution cause the device to:
   decode one or more video blocks based on the integer pixel values, the half-pixel values and/or the quarter-pixel values.

19. The non-transitory computer-readable storage medium of claim 15, further comprising instructions that upon execution cause the device to use one or more of the first predictive video data and the second predictive video data for motion compensation.

20. The non-transitory computer-readable storage medium of claim 15, wherein the instructions that cause the device to generate the first rounded version of the another half-pixel value comprise instructions that cause the device to generate the first rounded version of the another half-pixel value based on clipped versions of a first plurality of the non-rounded versions of the half-pixel values and non-clipped versions of a second plurality of the non-rounded versions of the half-pixel values.

21. A device that interpolates video data to generate predictive video data for video coding, the device comprising:
means for generating half-pixel values based on integer pixel values;
means for rounding the half-pixel values to generate half-pixel interpolated values, wherein a first set of predictive video data comprises the half-pixel interpolated values generated by rounding the half-pixel values;
means for storing the half-pixel values as non-rounded versions of the half-pixel values; and
means for generating quarter-pixel values based on the non-rounded versions of the half-pixel values and the integer pixel values, wherein a second set of predictive video data that is different than the first set of predictive video data comprises the quarter-pixel values generated based on the non-rounded versions of the half-pixel values and the integer pixel values;
means for generating a first rounded version of another half-pixel value based on a plurality of the non-rounded versions of the half-pixel values;
means for rounding the first rounded version of the another half-pixel value to generate a second rounded version of the another half-pixel value, wherein the first set of predictive video data further comprises the second rounded version of the another half-pixel value generated by rounding the first rounded version of the another half-pixel value; and
means for generating additional quarter-pixel values based on the first rounded version of the another half-pixel value and the non-rounded versions of the half-pixel values, wherein the second set of predictive video data further comprises the additional quarter-pixel values generated based on the first rounded version of the another half-pixel value and the non-rounded versions of the half-pixel values.

22. The device of claim 21, wherein every one of the values can be stored within a sixteen-bit data structure, and wherein the means for generating the first rounded version of the another half-pixel value comprise means for generating the first rounded version of the another half-pixel value so that the first rounded version of the another half-pixel value can be stored within the sixteen-bit data structure.

23. The device of claim 21, further comprising:
means for encoding one or more video blocks based on the integer pixel values, the half-pixel values and/or the quarter-pixel values.

24. The device of claim 21, further comprising:
means for decoding one or more video blocks based on the integer pixel values, the half-pixel values and/or the quarter-pixel values.

25. The device of claim 21, further comprising means for using one or more of the first predictive video data and the second predictive video data for motion compensation.

26. The device of claim 21, wherein the means for generating the first rounded version of the another half-pixel value comprise means for generating the first rounded version of the another half-pixel value based on clipped versions of a first plurality of the non-rounded versions of the half-pixel values and non-clipped versions of a second plurality of the non-rounded versions of the half-pixel values.

27. A device that encodes video data, the device comprising:
a video encoder including a motion compensation unit configured to encode the video data, wherein to encode the video data, the motion compensation unit is configured to generate half-pixel values based on integer pixel values, round the half-pixel values to generate half-pixel interpolated values, wherein a first set of predictive video data comprises the half-pixel interpolated values generated by rounding the half-pixel values, store the half-pixel values as non-rounded versions of the half-pixel values, and generate quarter-pixel values based on the non-rounded versions of the half-pixel values and the integer pixel values, wherein a second set of predictive video data that is different than the first set of predictive video data comprises the quarter-pixel values generated based on the non-rounded versions of the half-pixel values and the integer pixel values, generate a first rounded version of another half-pixel value based on a plurality of the non-rounded versions of the half-pixel values, round the first rounded version of the another half-pixel value to generate a second rounded version of the another half-pixel value, wherein the first set of predictive video data further comprises the second rounded version of the another half-pixel value generated by rounding the first rounded version of the another half-pixel value, and generate additional quarter-pixel values based on the first rounded version of the another half-pixel value and the non-rounded versions of the half-pixel values, wherein the second set of predictive video data further comprises the additional quarter-pixel values generated based on the first rounded version of the another half-pixel value and the non-rounded versions of the half-pixel values; and
a wireless transmitter configured to transmit the video data encoded by the motion compensation unit to another device.

28. The device of claim 27, wherein the device comprises a wireless communication handset.

29. A device that decodes video data, the device comprising:
a wireless receiver configured to receive the video data; and
a video decoder including a motion compensation unit configured to decode the video data, wherein to decode the video data, the motion compensation unit is configured to:
generate half-pixel values based on integer pixel values;
round the half-pixel values to generate half-pixel interpolated values, wherein a first set of predictive video data comprises the half-pixel interpolated values generated by rounding the half-pixel values;
store the half-pixel values as non-rounded versions of the half-pixel values; and
generate quarter-pixel values based on the non-rounded versions of the half-pixel values and the integer pixel values, wherein a second set of predictive video data that is different than the first set of predictive video data comprises the quarter-pixel values generated based on the non-rounded versions of the half-pixel values and the integer pixel values;
generate a first rounded version of another half-pixel value based on a plurality of the non-rounded versions of the half-pixel values;
round the first rounded version of the another half-pixel value to generate a second rounded version of the another half-pixel value, wherein the first set of predictive video data further comprises the second rounded version of the another half-pixel value generated by rounding the first rounded version of the another half-pixel value; and generate additional quarter-pixel values based on the first rounded version of the another half-pixel value and the non-rounded versions of the half-pixel values, wherein the second set of predictive video data further comprises the additional quarter-pixel values generated based on the first rounded version of the another half-pixel value and the non-rounded versions of the half-pixel values.

30. The device of claim 29, wherein the device comprises a wireless communication handset.

* * * * *